United States Patent
Smith et al.

(10) Patent No.: US 7,005,103 B2
(45) Date of Patent: *Feb. 28, 2006

(54) METHOD OF MAKING A COLORED AUTOMOTIVE TRIM PRODUCT

(75) Inventors: Henry H. Smith, Wales, MI (US); John Sienkiewicz, Lake Orion, MI (US)

(73) Assignee: Guardian Automotive Trim, Inc., Warren, MI (US)

( * ) Notice: Subject to any disclaimer, the term of this patent is extended or adjusted under 35 U.S.C. 154(b) by 647 days.

This patent is subject to a terminal disclaimer.

(21) Appl. No.: 09/963,396

(22) Filed: Sep. 27, 2001

(65) Prior Publication Data

US 2002/0009594 A1   Jan. 24, 2002

Related U.S. Application Data

(63) Continuation of application No. 09/416,888, filed on Oct. 13, 1999, now Pat. No. 6,319,438, which is a continuation-in-part of application No. 09/210,852, filed on Dec. 15, 1998, now Pat. No. 6,187,233.

(51) Int. Cl.
*B29C 45/14* (2006.01)
*B29C 51/10* (2006.01)

(52) U.S. Cl. .......... 264/510; 264/553; 264/210.1; 264/247; 264/250; 425/127; 425/388

(58) Field of Classification Search ........ 264/510, 264/553, 210.1, 247, 250; 425/388, 127
See application file for complete search history.

(56) References Cited

U.S. PATENT DOCUMENTS

| | | |
|---|---|---|
| 4,403,004 A | 9/1983 | Parker et al. |
| 4,828,637 A | 5/1989 | Mentzer et al. |
| 4,830,892 A | 5/1989 | Nussbaum |
| 4,902,557 A | 2/1990 | Rohrbacher |
| 4,931,324 A | 6/1990 | Ellison et al. |
| 4,957,802 A | 9/1990 | Mentzer et al. |
| 5,037,680 A | 8/1991 | Papendick et al. |
| 5,122,905 A | 6/1992 | Wheatley et al. |
| 5,226,998 A | 7/1993 | Few |
| 5,300,587 A | 4/1994 | Mascia et al. |
| 5,306,548 A | 4/1994 | Zabrocki et al. |
| 5,316,703 A | 5/1994 | Schrenk |
| 5,409,653 A | 4/1995 | Malm |
| 5,441,816 A | 8/1995 | Grohman |
| 5,455,289 A | 10/1995 | Caselli |

(Continued)

FOREIGN PATENT DOCUMENTS

DE   41 16 437   11/1991

(Continued)

OTHER PUBLICATIONS

U.S. Appl. No. 09/416,888, filed Oct. 13, 1999.

(Continued)

*Primary Examiner*—Edmund H. Lee
(74) *Attorney, Agent, or Firm*—Nixon & Vanderhye P.C.

(57) ABSTRACT

An automotive trim product is made as follows. A single or multiple layer sheet is extruded so as to include at least one color pigmented and/or metallized layer therein. The sheet is then thermoformed into a three-dimensionally shaped preform via vacuum forming or the like. The preform is placed into a cavity of an injection molding apparatus and heated semi-molten material is injected thereinto. The semi-molten material bonds to the preform in the cavity. After cycling, the molding apparatus ejects a final automotive trim part. Optionally, some processing (e.g. trimming) may be performed following ejection.

3 Claims, 14 Drawing Sheets

U.S. PATENT DOCUMENTS

| | | |
|---|---|---|
| 5,478,516 A | 12/1995 | Malm et al. |
| 5,486,327 A | 1/1996 | Bemis et al. |
| 5,496,630 A | 3/1996 | Hawrylko et al. |
| 5,518,786 A * | 5/1996 | Johnson et al. ............ 428/40.6 |
| 5,525,675 A | 6/1996 | Masuda et al. |
| 5,532,045 A | 7/1996 | Wade |
| 5,545,448 A | 8/1996 | Ford et al. |
| 5,562,931 A | 10/1996 | Takeuchi |
| 5,599,608 A | 2/1997 | Yamamoto et al. |
| 5,707,697 A | 1/1998 | Spain et al. |
| 5,725,712 A | 3/1998 | Spain et al. |
| 5,750,234 A | 5/1998 | Johnson et al. |
| 5,759,477 A | 6/1998 | Yamamoto |
| 5,772,827 A | 6/1998 | Malm |
| 5,811,053 A | 9/1998 | Ota et al. |
| 5,866,054 A | 2/1999 | Dorchester et al. |
| 5,912,283 A | 6/1999 | Hashizume et al. |
| 5,916,643 A | 6/1999 | Spain et al. |
| 5,919,537 A | 7/1999 | Niazy |
| 5,939,195 A | 8/1999 | Allen et al. |
| 6,017,989 A | 1/2000 | Malm et al. |
| 6,187,233 B1 | 2/2001 | Smith |
| 6,284,183 B1 * | 9/2001 | Roys et al. ................ 264/345 |
| 6,319,438 B1 | 11/2001 | Smith et al. |
| 2002/0009598 A1 | 1/2002 | Lafave et al. |

FOREIGN PATENT DOCUMENTS

| | | |
|---|---|---|
| EP | 0 419 001 | 3/1991 |
| EP | 0 864 417 | 9/1998 |
| EP | 0 868 995 | 10/1998 |
| GB | 2 323 554 | 9/1998 |
| WO | WO 99/08870 | 2/1999 |

OTHER PUBLICATIONS

U.S. Appl. No. 09/210,852, filed Dec. 15, 1998.

Patent Abstracts of Japan, vol. 17, No. 286 (M-1422), Jun. 2, 1993 & JP 05 016171 A (Sekisui Chem CO LTD.), Jan. 26, 1993.

* cited by examiner

METHOD OF MAKING A COLORED AUTOMOTIVE TRIM PRODUCT

This application is a continuation of U.S. patent application Ser. No. 09/416,888 filed Oct. 13, 1999, now U.S. Pat. No. 6,319,438, which is a continuation-in-part (CIP) of U.S. patent application Ser. No. 09/210,852, filed Dec. 15, 1998, now U.S. Pat. No. 6,187,233, the disclosure of which is hereby incorporated herein by reference.

This invention relates to trim components for automobiles and similar vehicles, as well as to methods of making the same. More particularly, this invention relates to exterior components of such vehicles which are provided for either appearance purposes or are of a size and shape to make a visual contribution to the exterior appearance of a vehicle.

BACKGROUND OF THE INVENTION

It is known to apply automotive trim pieces to the exterior of wheeled vehicles such as cars and trucks. Examples of such trim include accent stripes, side door bumper elements, upper and lower bumper covers, air damns, A B C & D pillars, claddings, wheel covers, grills, moldings, appliques, wheel flare moldings, body panels, and bumper fascia. The instant invention further applies to exterior vehicle components which have previously been made of plastic materials, such as door sides and the like.

Exterior molded automotive trim components are typically painted in order to provide them with color. It is desirable that the paint color be compatible with the appearance of the vehicle (e.g. matching that of the vehicle, or complimentary thereto). Following painting of a molded piece of trim, a clear coat is often sprayed over the paint to give it luster.

Unfortunately, spray painting of molded components for use on vehicles is often undesirable due to the potential for resulting paint lines, a need for masking, and/or the corresponding labor involved. Moreover, spray painting is undesirable due to the high capital equipment cost associated with paint line equipment, and/or potentially hazardous environmental issues relating to required solvents and the like. Thus, it will be apparent to those of skill in the art that it would be desirable if automotive trim components could be manufactured in a manner so that they were color compatible (e.g. matching or aesthetically pleasing complimentary or non-matching) with automotive exteriors, without the need for spray painting.

U.S. Pat. No. 5,037,680, the disclosure of which is incorporated herein by reference, discloses a trim product made as follows. As discussed at col. 6, lines 15–45 of the '680 patent, a thermoplastic resin is transformed during an injection molding process into a shaped substrate in the form of a bumper fascia. Thereafter, a clear coat is deposited thereon by brushing, spraying, dipping, or flow coating. Unfortunately, this method is problematic for at least the following reasons. First, as the semi-molten colored material flows into the injection molding cavity color pigments therein may tend to collect at corners, bosses or edges due to flow patterns and/or different thicknesses in the cavity. This may result in certain areas of the product being colored differently than others. Second, metallizing material is not disclosed as being introduceable into the colored material in the '680 patent. Third, color pigment distribution may be non-uniform and/or inconsistent because of the disruptions during introduction of molten thermoplastic resin into an injection molding device (e.g. after the injection molding cavity has been filled, introduction of the resin is stopped until the next shot). Again, this may lead to inconsistent coloring of the final product(s). Fourth, it is sometimes undesirable to use solvents in the application of the clear coat for environmental reasons. It is a purpose of this invention to overcome any or all of these problems.

Other problems with injection molding of colored materials are as follows: problems molding metallics as they tend to swirl or collect at gate(s) and other features; difficult to control gloss as the temperature of the mold required for optimum color material flow may not result in desired gloss; and ghosting.

Another approach to automotive trim coloring includes the use of dry paint film. Dry paint film technology is disclosed, for example, in U.S. Pat. No. 5,725,712, the disclosure of which is hereby incorporated herein by reference.

Prior art FIGS. 1–10 will be referred to for the purpose of describing conventional dry paint film technology. Automobile 1 of FIG. 1 includes bumper fascia 3, wheel covers 5, and other exterior components which may be made via injection molding technology. The first step is the provision of dry laminate 7 of FIG. 2, including self-supporting carrier sheet 9 (i.e. casting film), clear coat 11, paint coat 13, and optional size coat 15 for providing adhesion to a backing sheet in a subsequent laminating step. Clear coat 11 is coated onto carrier 9 by a complicated reverse roll coating process shown in prior art FIG. 3, in which clear coat lacquer is contained in coating pan 17. Applicator roll 19 picks up lacquer from the pan and coats it onto carrier film 21 (or 9) after it passes over guide roll 23. After exiting the nip (or die) between applicator roll 19 and rubber backup roll 25, the coated carrier film 27 passes to a multiple zone drying oven. After drying, a two layered laminate, including carrier 9 and clear coat 11, is provided.

Color coat 13 is bonded to clear coat 11 after the clear coat has dried on carrier 9. Color paint coat 13 is typically applied to the carrier by reverse roller coating techniques as shown in FIG. 3, with the color coat being dried by passing it through the multiple drying zones discussed above in curing the clear coat. Thus, the complicated reverse rolling techniques and multi-zone drying ovens of FIG. 3 are utilized on numerous occasions. Size coat 15 is next coated onto paint coat 13. The result is laminate 7 of FIG. 2.

Laminate 7 is laminated to a backing sheet by dry paint transfer laminating techniques shown in FIG. 4, to form laminate 29 of FIG. 5. During this laminating step of FIG. 4, paint-coated laminate 7 is stored on roll 31 and a flexible backing 33 is stored on roll 35. When rolls 31 and 35 unwind as shown in FIG. 4, and the webs respectively pass over drums 37, laminate 7 and sheet 33 are bonded together between heated laminating drum 39 and roll 41. The resulting laminate 29 then passes onto storage drum 43. The result is a roll of laminate 29 of FIG. 5, including a color determined by the colored pigment in paint layer 13. Laminate 29 includes backing sheet 33, size coat 15, color coat 13, and clear coat 11.

Next, laminate 29 is thermo-formed into a desired three-dimensional shape. Referring to FIG. 6, laminate 29 is placed inside clamping frame 45 of a vacuum-forming machine. Frame 45 is moved into oven 47 for heating laminate 29. Backing sheet 33 is heated in oven 47 and laminate 29 sags as shown at 49. Then, clamping frame 45 is moved back to the position above vacuum-forming buck 51. The preheated laminate 29 is vacuum-formed into a desired shape by drawing a vacuum on buck 51 through connection 53 to a vacuum pump, and buck 51 is raised to its FIG. 7 position. Vacuum is pulled through holes in buck 51 to force the pre-heated plastic of laminate 29 into the shape of the working surface of buck 51.

Next, shaped laminate 29 is bonded to a substrate panel as shown in FIGS. 8–9. Laminate 29 is placed in an injection mold and fused or bonded to the face of an injection molded substrate 55. FIG. 8 shows laminate 29 placed in the mold cavity between front and rear mold halves 57 and 59. Surface 61 may be a rigid, high gloss, highly polished surface. After laminate 29 is in place, semi-molten injection molding material 55 is injected into the mold through passage 63 behind laminate 29. The molding material conforms to the shape of the mold cavity and is permanently fused to backing sheet 33 of laminate 29 in the mold. A cross-section of the resulting three-dimensionally molded trim component is shown in FIG. 10.

As can be seen above, dry paint film transfer technology may be burdensome and complicated. For example, the aforesaid process illustrated in FIGS. 1–10 requires going through rollers and dryers on numerous occasions, as well as the required time to do same. Moreover, it has been found that the life span of such trim components may be limited because they can lose color quickly upon exposure to heat, sun, chemicals, or the like. The film is expensive, especially in small batches, and has limited elongation which limits drawing ability. Problems have also been experienced with regard to maintaining DOI (depth of image), in that DOI may be lost due to deep draws in the components. Depth of pockets or corners in the final molded components is also limited due to the dry paint film, as it may not be overstretched or it may lose color and/or gloss.

It is apparent from the above that there exists a need in the art for colored and molded automotive trim components/parts which: (i) may be manufactured without the requirement of prior art dry color paint film transfer; (ii) are colored so as to match or compliment a color of the surrounding vehicle; (iii) may be manufactured at a reasonable cost; (iv) have an adequate life span upon exposure to heat, sun, chemicals, and/or the like; (v) may be manufactured without excessive capital expenditure; (vi) substantially maintain DOI; (vii) are scratch resistant, have luster, and are resistant to marring; (viii) have high gloss and retention of same; (ix) have color uniformity; (x) are resistant to gasoline, solvents and/or acid spotting; (xi) have satisfactory hardness and/or abrasion resistance; (xii) have satisfactory impact strength; (xiii) have acceptable UV resistance; (xiv) are resistant to water and humidity exposure; (xv) may be manufactured without the need to "spray" on clear coats with solvents; (xvi) may be made so that color pigment material in the product is approximately consistently distributed throughout at least one color layer; (xvii) may be made so as to have generally consistent coloration throughout at least one color layer; (xviii) may be made so as to reduce flaws such as flow lines, knit lines, sinks and/or the like; (xix) may be made so that metallizing material/particles can be approximately uniformly distributed throughout at least one color layer(s) of the product; and/or (xx) may be made using readily available industrial equipment such as vacuum forming devices, extrusion devices and/or injection molding machines. There exists a need in the art for molded trim product(s)/part(s) having any or all of the aforesaid characteristics, as well as methods of manufacturing the same.

It is a purpose of this invention to fulfill any and/or all of the above-described needs in the art, as well as other needs which will become apparent to the skilled artisan from the following detailed description of this invention.

SUMMARY OF THE INVENTION

An object of this invention is the provision of an exterior automotive trim component which is simple to construct, economical to manufacture, and effective in operation.

It is an object of this invention to provide an exterior automotive trim component which is provided for exterior appearance purposes defining color which matches or compliments a surrounding color of a vehicle.

It is another object of this invention to provide at least one color pigmented layer upon which a substantially transparent clear coat may be provided either by coextrusion or by post-extrusion lamination.

It is another object of this invention to eliminate the need for dry color paint film transfer technology, and/or to eliminate the need for spray painting of molded automotive trim components.

It is still another object of this invention to place an extruded sheet of color pigmented plastic material (optionally with a clear coat(s) and/or tie layer(s) bonded or laminated thereto) in a vacuum forming device for thermoforming so as to obtain a three-dimensionally shaped "preform." In certain embodiments, the single or multi-layer preform may then be placed in an injection molding cavity, with flowable plastic being injected into the cavity behind the preform so as to bond thereto either directly or indirectly. Stabilizers and/or enhancers may be provided in any or every layer in any embodiment herein. The result may be used as or in the manufacture of an automotive trim part.

Yet another object of this invention is to extrude a color pigmented plastic substrate, vacuum-form the same into a preform skin, thereafter place it into an injection mold and inject additional colored or non-colored plastic behind it, cool it; the result being a molded and colored automotive trim component or part.

Another object of this invention is to provide a tie layer sandwiched between at least one clear coat layer and an extruded color layer. In certain embodiments, the tie layer(s) and/or the clear coat layer(s) may include UV stabilizing material or any other type of enhancer. Certain tie layer(s) may be transparent, while in other embodiments tie layer(s) may include color pigment and/or metallizing particles or material.

Another object of this invention is to provide multiple clear coat layers on an extruded color layer or tie layer, for depth of image purposes.

Yet another object of this invention to place a sheet of color pigmented plastic material (optionally with a clear coat(s) and/or tie layer(s) bonded or laminated thereto) into a cavity of an injection molding apparatus; and thereafter inject flowable plastic into the cavity behind the extruded sheet so as to bond thereto and deform the sheet into at least part of a three-dimensionally shaped product.

Generally speaking, this invention fulfills any and/or all of the above described objects and/or needs in the art by providing an automotive trim part comprising:

an injection molded base substrate;

a layer system on said base substrate; and wherein said layer system includes an extruded colored layer including color pigment material and metallizing particles therein.

This invention further fulfills any and/or all of the above described needs and/or objects by providing a method of making a colored automotive trim product comprising the steps of:

extruding an approximately planar sheet including at least a colored layer, the color layer including color pigment material and metallizing material therein;

positioning the approximately planar sheet in a vacuum-forming apparatus;

vacuum-forming the sheet into a three-dimensionally shaped preform;

providing the preform in a cavity of an injection molding apparatus;

injecting heated semi-molten or flowable material into the cavity of the injection molding apparatus so that the semi-molten material bonds to the preform to form a three-dimensionally shaped article;

removing the shaped article from the injection molding apparatus; and using the shaped article as at least part of an exterior trim product for a vehicle.

This invention will now be described with respect to certain embodiments thereof, along with reference to the accompanying illustrations.

IN THE DRAWINGS

Figure 11A:
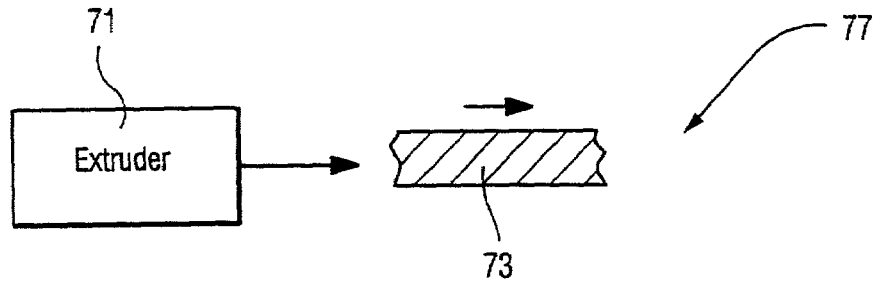
FIG. 11(a) is a side partial cross sectional and partial schematic view illustrating extrusion of a flat color pigmented thermoplastic sheet according to an embodiment of this invention.
Figure 11B:
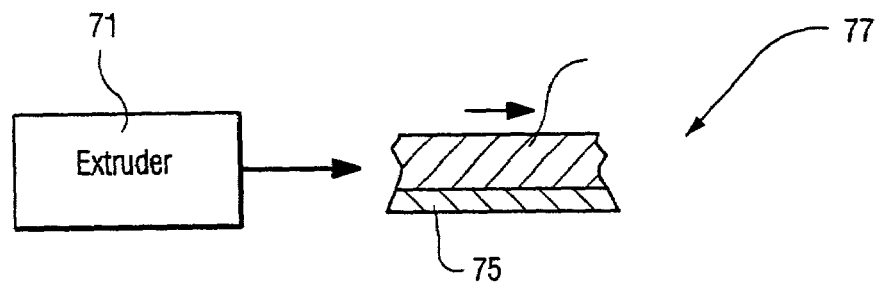
FIG. 11(b) is a side partial cross sectional and partial schematic view illustrating extrusion of a flat color pigmented thermoplastic sheet (included a color pigmented layer and a tie layer) according to an embodiment of this invention.
Figure 11C:
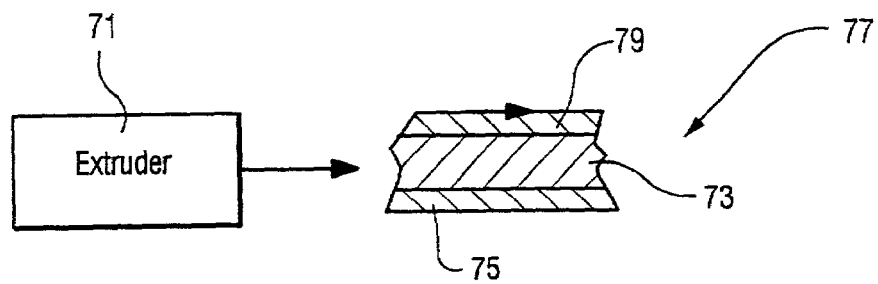
FIG. 11(c) is a side partial cross sectional and partial schematic view illustrating extrusion of a flat color pigmented thermoplastic sheet (including a color pigmented layer, a tie layer, and a clear coat layer) according to an embodiment of this invention.
Figure 11D:
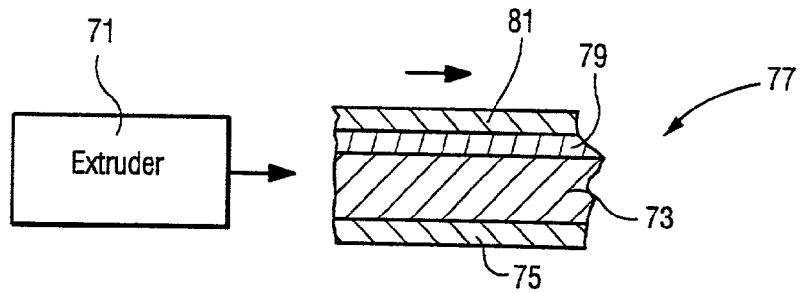
FIG. 11(d) is a side partial cross sectional and partial schematic view illustrating extrusion of a flat color pigmented thermoplastic sheet (including a color pigmented layer, a tie layer, a clear coat layer, and a protective layer) according to an embodiment of this invention.
Figure 11E:
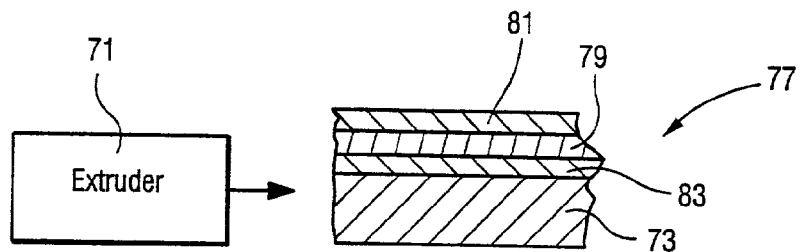
FIG. 11(e) is a side partial cross sectional and partial schematic view illustrating extrusion of a flat color pigmented thermoplastic sheet (including a color pigmented layer, a tie layer, a clear coat layer, and a protective layer) according to an embodiment of this invention.
Figure 11F:
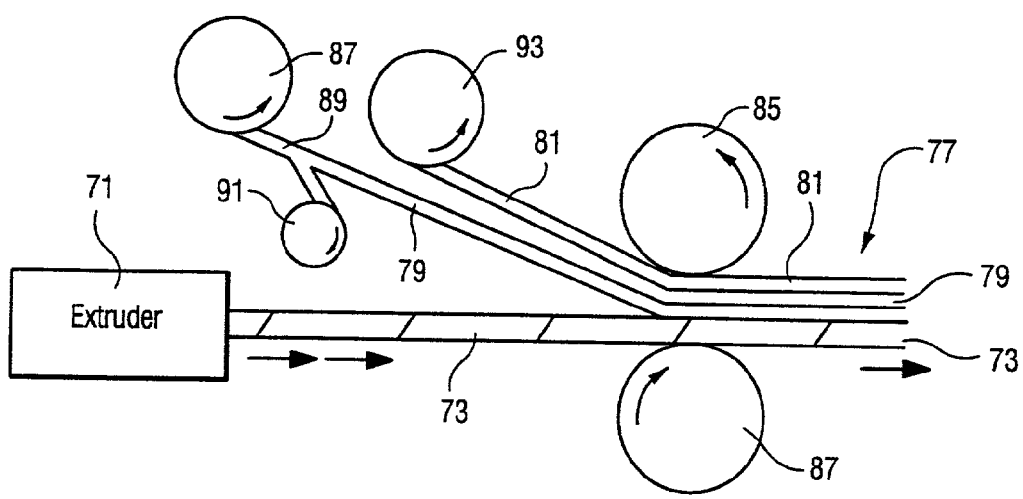
FIG. 11(f) is a side partial cross sectional and partial schematic view illustrating extrusion of a flat color pigmented thermoplastic layer where a tie layer and a clear coat layer are subsequently laminated thereto using roll(s)/drum(s) after extrusion, according to an embodiment of this invention.
Figure 11G:
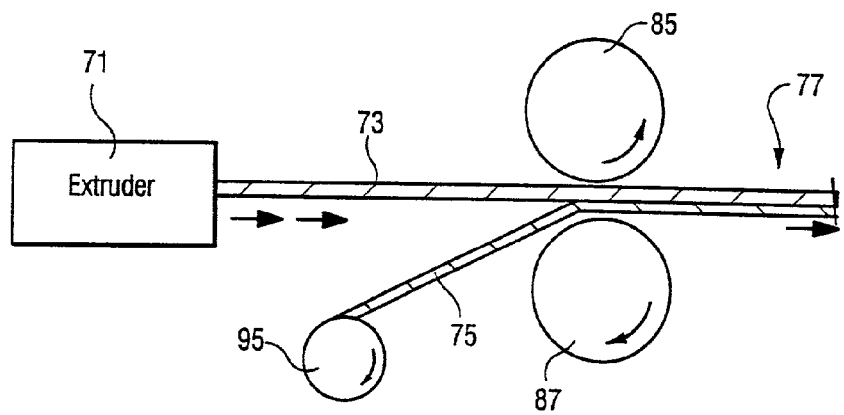
FIG. 11(g) is a side partial cross sectional and partial schematic view illustrating extrusion of a flat color pigmented thermoplastic layer where a tie layer is subsequently laminated thereto after extrusion, according to an embodiment of this invention.
Figure 11H:
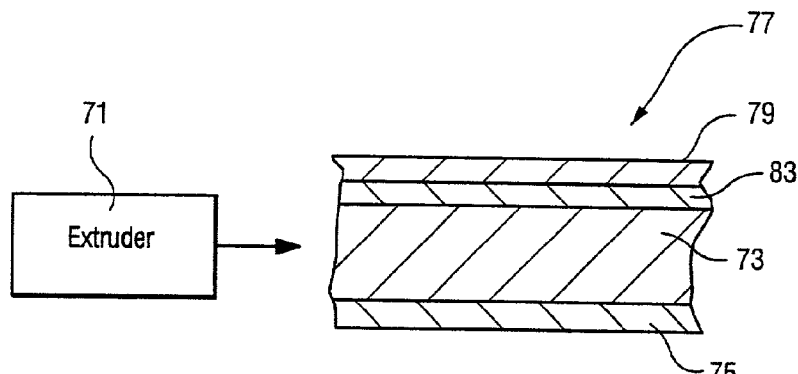

FIG. 11(h) is a side partial cross sectional and partial schematic view illustrating extrusion of a flat color pigmented thermoplastic sheet including a color pigmented layer, a first tie layer on a bottom side of the color pigmented layer, and a second tie layer on a top side of the color pigmented layer between the color layer and an overlying clear coat layer, according to an embodiment of this invention.

Figure 11I:
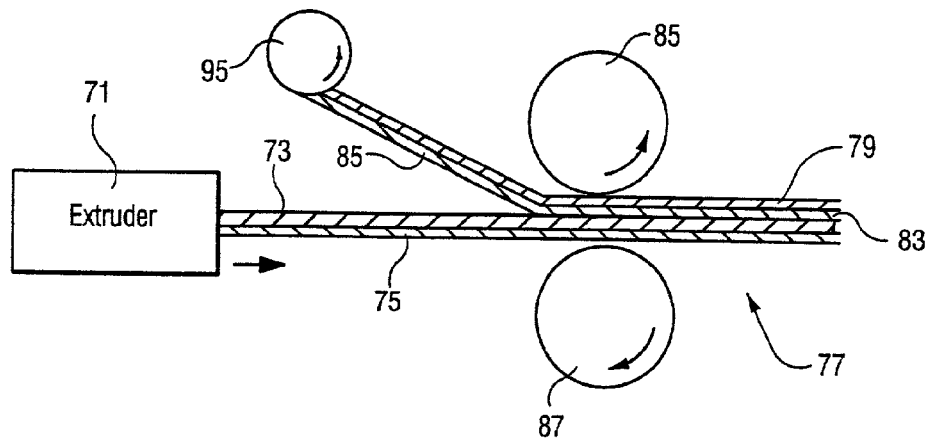

FIG. 11(i) is a side partial cross sectional and partial schematic view illustrating coextrusion of the color pigmented and bottom tie layers of FIG. 11(h), with a prelaminate of the upper tie layer and clear coat of FIG. 11(h) being subsequently laminated to the coextruded article.

Figure 11J:
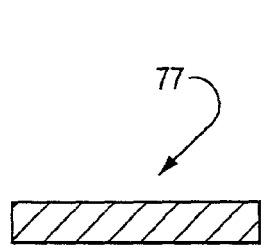
Figure 11K:
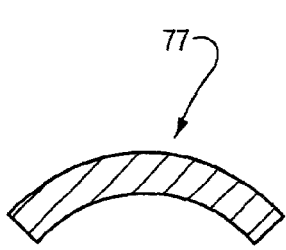
Figure 11L:
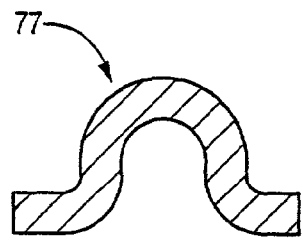

FIGS. 11(j), 11(k), and 11(l) are cross sectional front or end views of different sheet shapes that can be extruded or otherwise formed according to any of the embodiments of FIGS. 11(a)–11(i).

Figure 12:
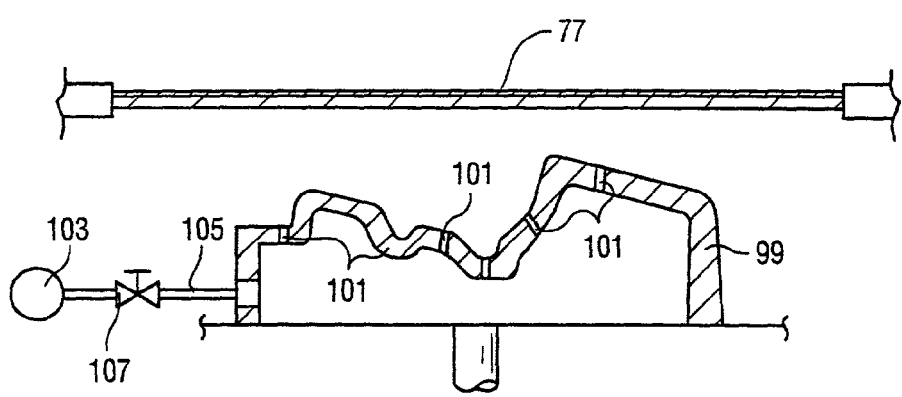

FIG. 12 is a cross-sectional view illustrating the positioning of an at least partially extruded sheet according to any of FIGS. 11(a)–11(l) in a vacuum-forming device according to an embodiment of this invention.

Figure 13:
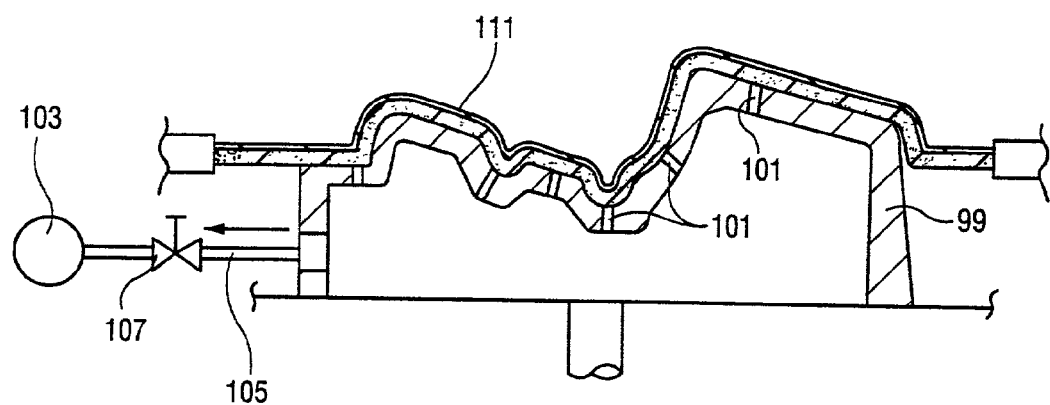

FIG. 13 is a side cross-sectional view illustrating vacuum-forming of the at least partially extruded sheet of any of FIGS. 11(a)–11(l) using the FIG. 12 device according to an embodiment of this invention.

Figure 14:
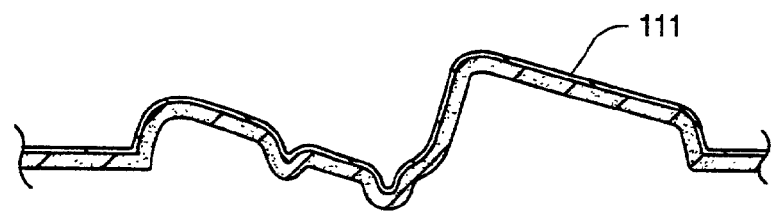

FIG. 14 is a partial side cross-sectional view of the three-dimensionally shaped preform resulting from the vacuum forming of FIGS. 12–13 or any other suitable thermoforming.

Figure 15:
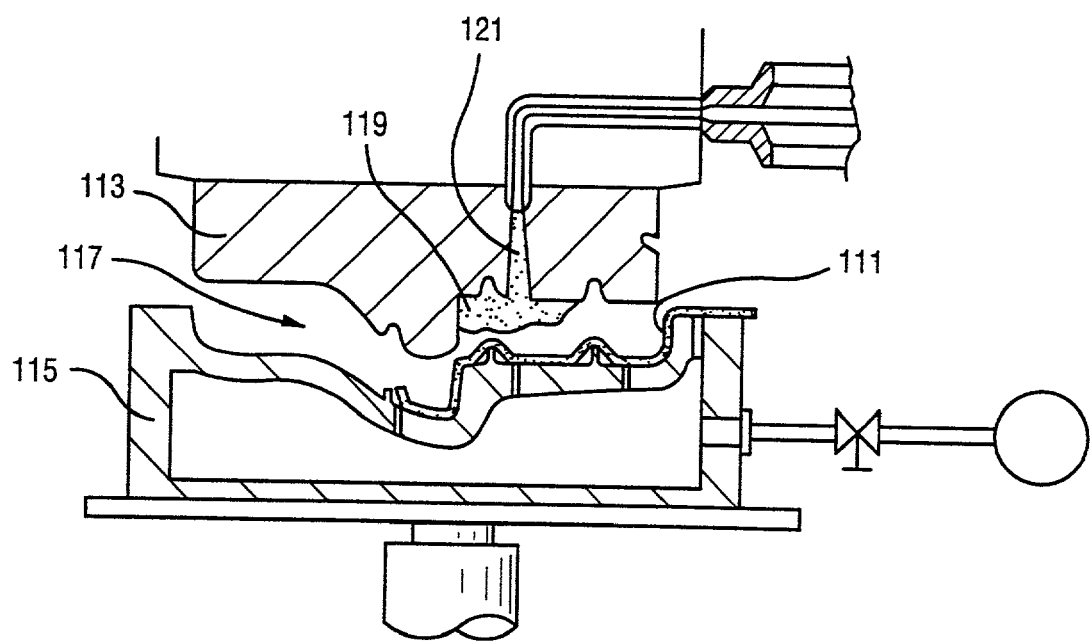

FIG. 15 is a side cross-sectional view illustrating a three-dimensionally shaped preform placed in a cavity of an injection molding device, with flowable or semi-molten plastic being shot into the cavity behind the preform.

Figure 16:
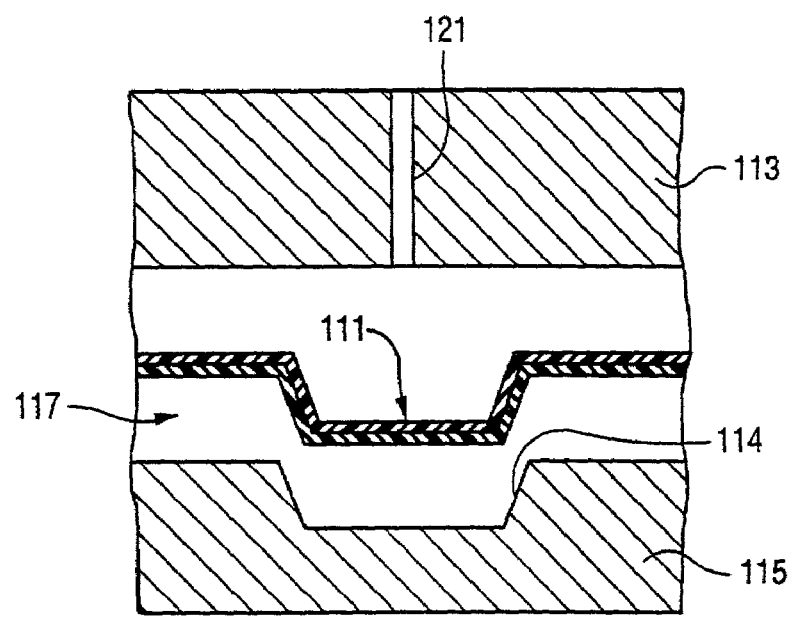

FIG. 16 is a side cross sectional view illustrating a three-dimensionally shaped preform placed in a cavity of an injection molding device.

Figure 17:
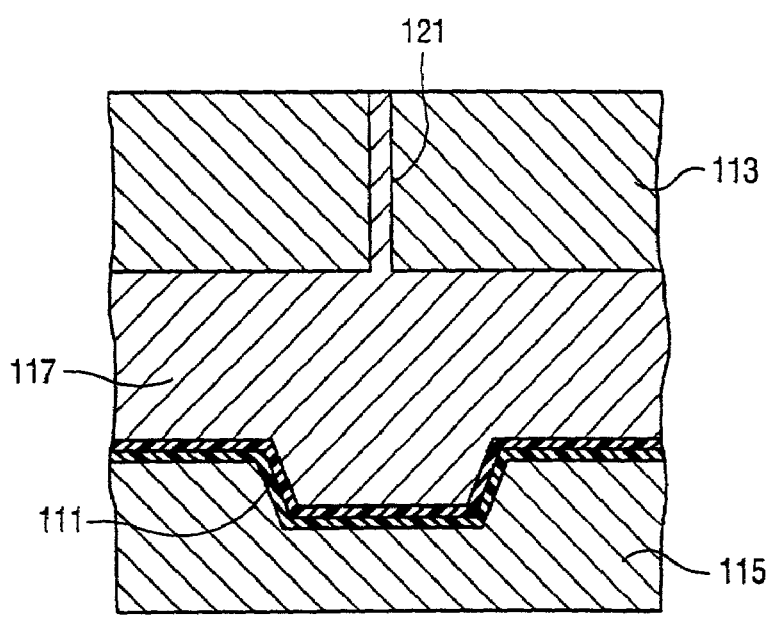

FIG. 17 is a side cross sectional view illustrating flowable or semi-molten plastic material being injected into the cavity of FIG. 16 so that the plastic material bonds to the preform.

Figure 18:
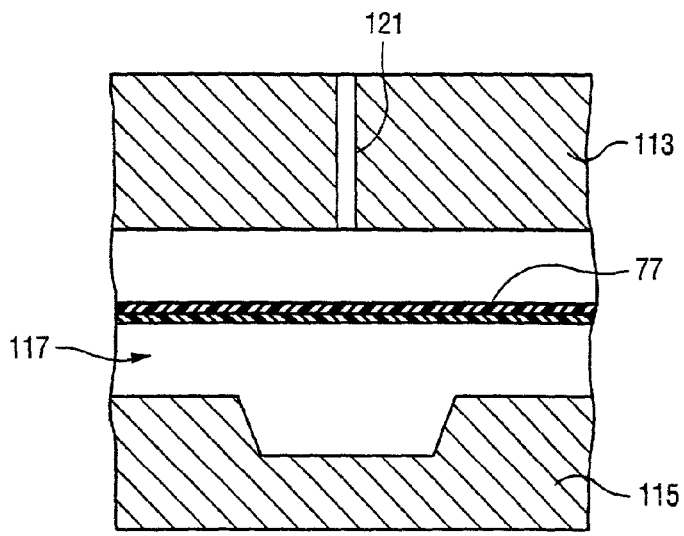

FIG. 18 is a side cross sectional view illustrating an at least partially extruded sheet of any of FIGS. 11(a)–11(l) being inserted into a cavity of an injection molding device, according to another embodiment of this invention.

Figure 19:
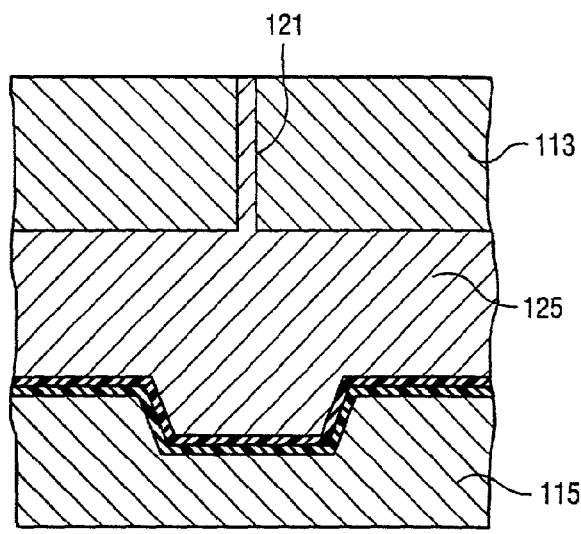

FIG. 19 is a side cross sectional view illustrating flowable or semi-molten plastic material being injected into the cavity of FIG. 18 so that the plastic material bonds to and deforms the at least partially extruded sheet into a three-dimensionally molded shape of an automotive trim part.

Figure 20:
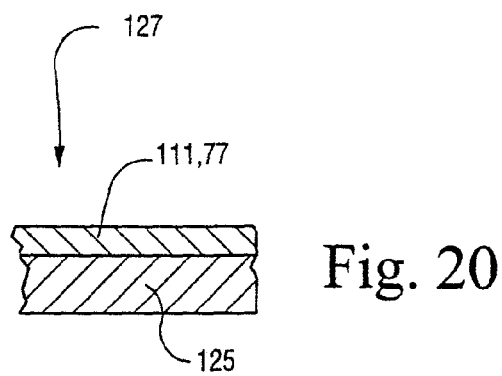

FIG. 20 is a partial cross-sectional view of a final automotive trim product according to an embodiment of this invention, with layer 125 being a base substrate formed by injection molding and layer system 111 including one or more layers as illustrated in any of FIGS. 11(a)–11(i).

Figure 21:
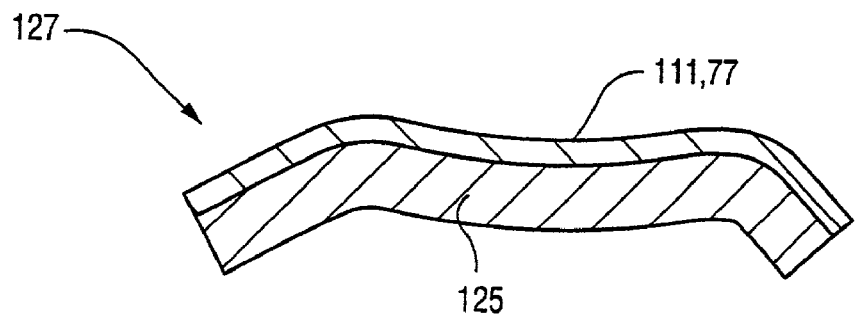

FIG. 21 is a cross-sectional view of a final automotive trim product according to an embodiment of this invention, with layer 125 being a base substrate formed by injection molding and layer system 111 including one or more layers as illustrated in any of FIGS. 11(a)–11(i).

Figure 22:
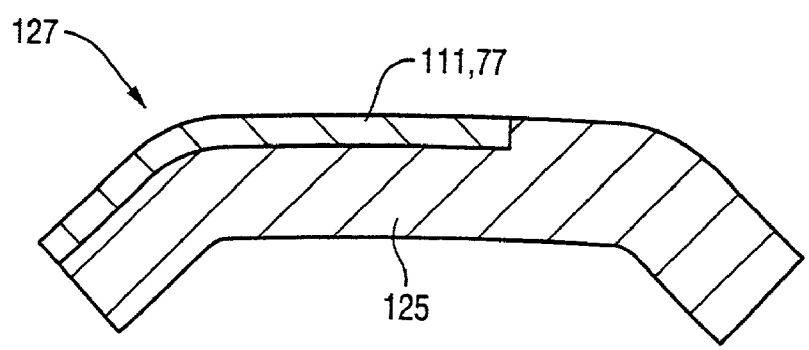

FIG. 22 is a cross-sectional view of a final automotive trim product according to an embodiment of this invention, with layer 125 being a base substrate formed by injection molding and layer system 111 including one or more layers as illustrated in any of FIGS. 11(a)–11(i).

Figure 23:
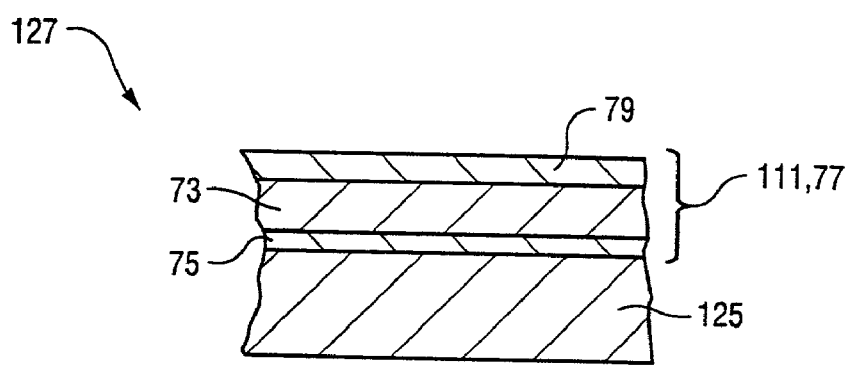

FIG. 23 is a partial cross sectional view of a final trim product according to an embodiment of this invention where layer system 111 results from the FIG. 11(c) embodiment.

Figure 24:
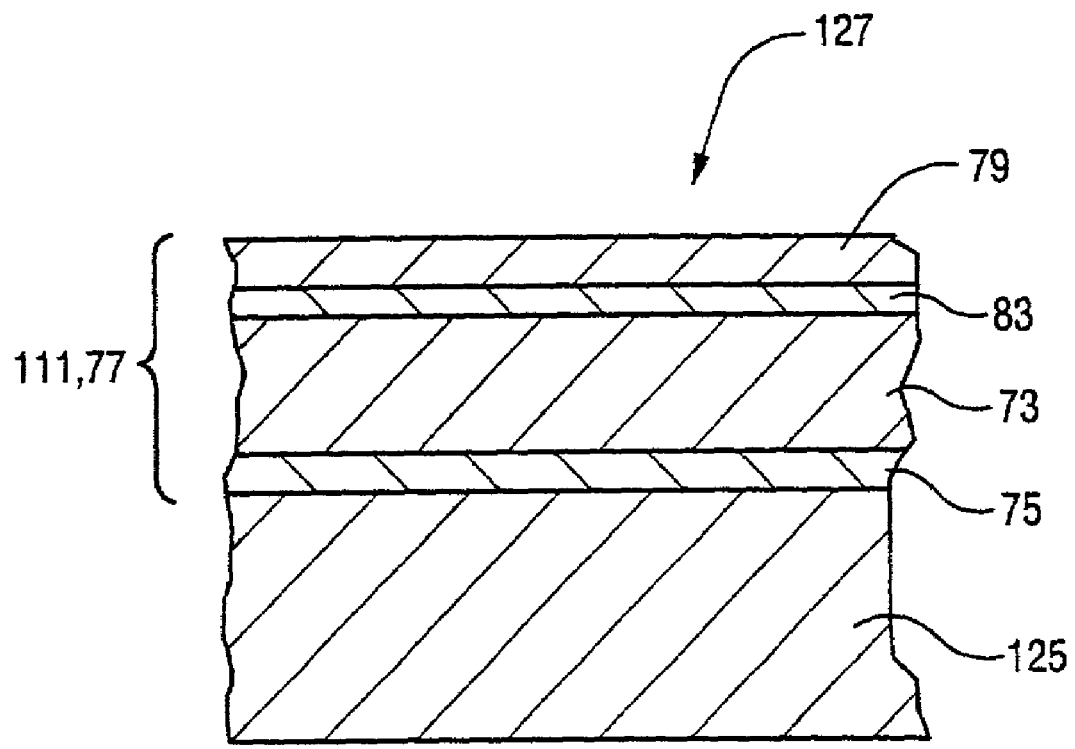

FIG. 24 is a cross sectional view of a final trim part/product according to an embodiment of this invention where layer system 111 results from either of the FIG. 11(h) or 11(i) embodiments.

DETAILED DESCRIPTION OF CERTAIN EMBODIMENTS OF THIS INVENTION

Referring now more particularly to the accompanying drawings in which like reference numerals indicate like parts throughout the several views.

Figure 1:
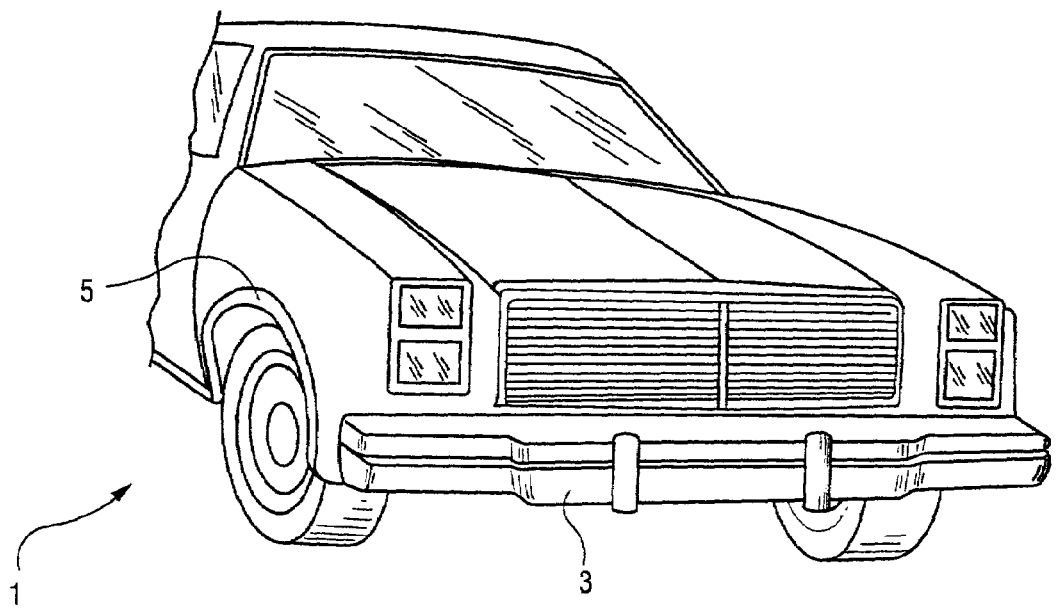
FIG. 1 is a prior art perspective view of an automobile.
Figure 2:
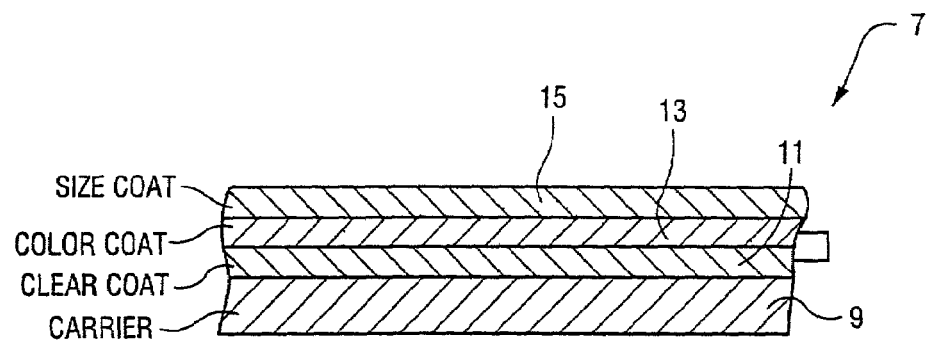
FIG. 2 is a prior art side cross-sectional view of a paint-coated carrier having other layers thereon.
Figure 3:
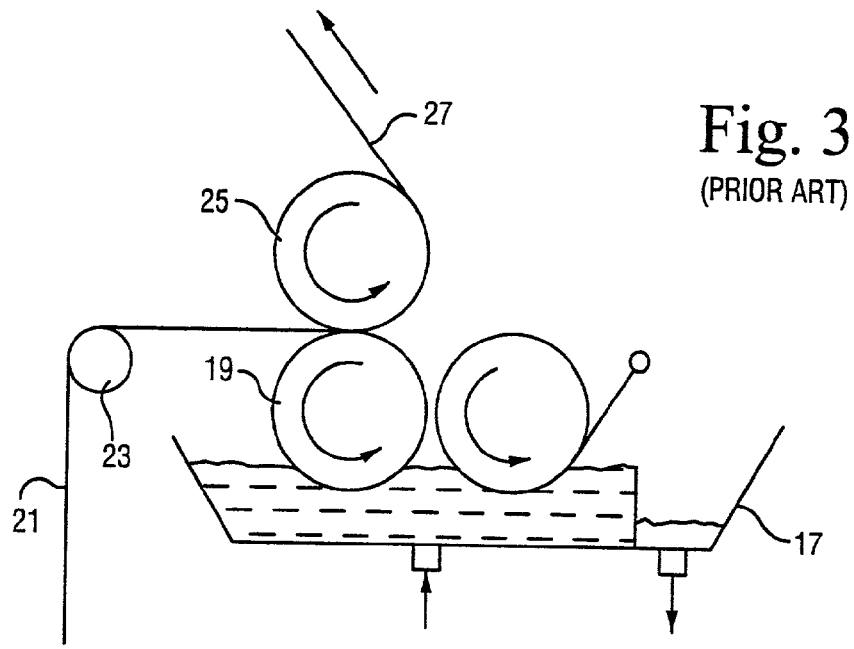
FIG. 3 is a prior art schematic side elevation view illustrating a step during the process of making the laminate of FIG. 2.
Figure 4:
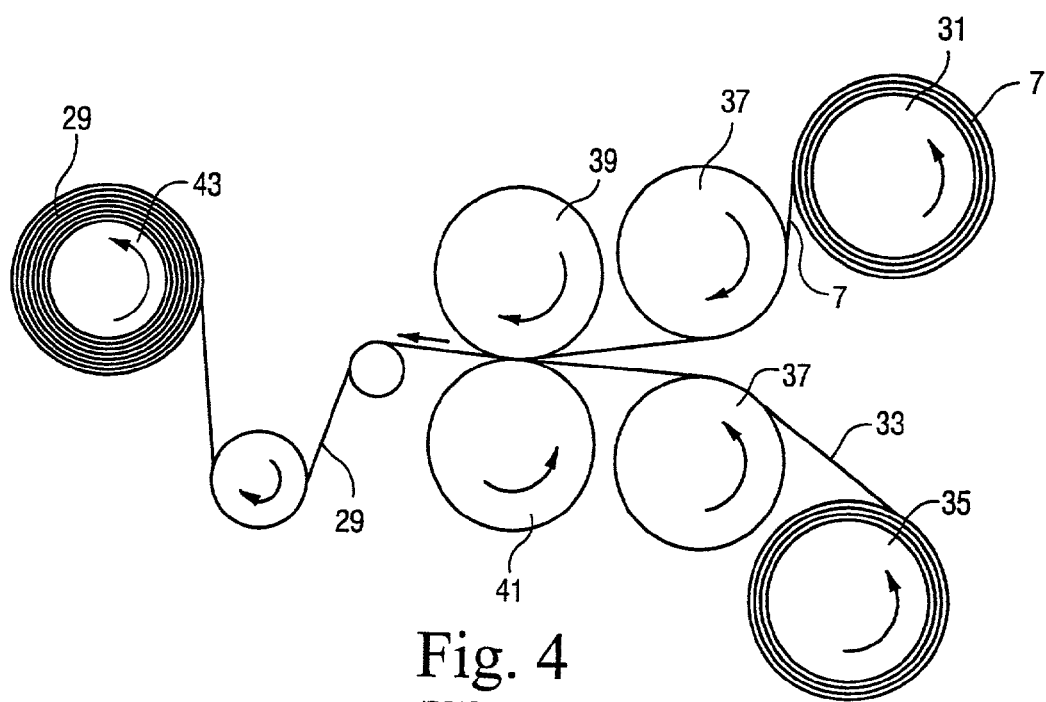
FIG. 4 is a prior art schematic side view illustrating a laminating step used in making the laminate of FIG. 5.
Figure 5:
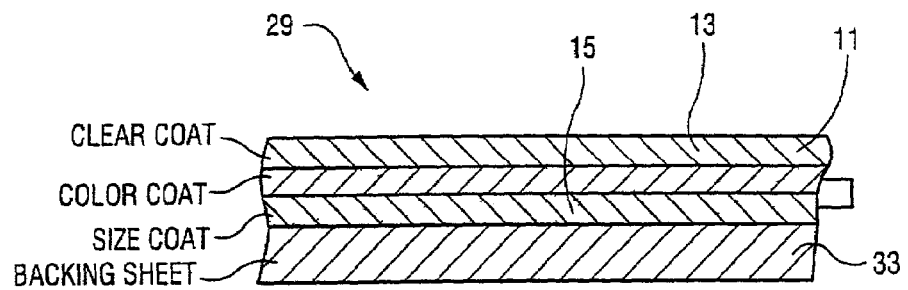
FIG. 5 is a prior art cross-sectional view illustrating a dry composite paint coat transferred to a backing sheet during the laminating step.

It should be understood that trim products in accordance with certain embodiments of this invention are adapted to be mounted on exteriors of vehicles such as that illustrated in prior art FIG. 1, as well as all other types of automotive vehicles including sedans, station wagons, sport utility vehicles (SUVs), convertibles, limousines, trucks, and the like. The components are to be provided for exterior appearance purposes so as to either match the color of the corresponding vehicle, or to compliment the color of the corresponding vehicle. Exemplary automotive trim products which may be made in accordance with methods disclosed herein include wheel covers, door sides, bumper fascia, claddings, body side moldings, wheel trim, wheel flares, sill moldings, spoilers, roof moldings, beltline moldings, ditch moldings, bumper covers, window moldings, grills, air damns, upper and lower bumper covers, A B C and/or D pillar moldings and appliques, cowl moldings and screens, greenhouse moldings, and the like. In other embodiments, entire exterior automobile body panels such as hoods, door panels, quarter panels, fenders, trunks, and the like may be made in accordance with methods and resulting products of this invention. In certain other embodiments, methods and products herein may be utilized as components (e.g. hoods or panels) on devices other than automobiles, such as on snowmobiles, lawn tractors, and the like.

Generally speaking, this invention relates to an automotive trim product which may be made as follows. A color pigmented thermoplastic material(s) is extruded into a sheet. Optionally, a tie layer(s), a clear coat layer(s) and/or a protective layer(s) may be provided on either side of the color pigmented layer in certain embodiments to make up the sheet (the term "on", or "onto", herein means supported by, and thus includes when a layer is in either direct or indirect contact with another layer). The thermoplastic layer is extruded in a manner so as to include color pigment material and/or metallizing particles approximately uniformly distributed or dispersed throughout the layer(s). The even distribution of color pigment and/or metallizing particles provides for a more consistently colored and/or metalized product (as opposed to introducing pigment and/or metallizing particles via flowable material into an injection molding cavity in original formation). The single or multi-piece sheet is then thermoformed (e.g. via vacuum forming) into a three dimensionally shaped "preform." The preform may be an exact match of the end trim part intended or alternatively of an intermediate shape. The preform is then positioned in the cavity of an injection molding device. Semi-molten plastic material is injected into the cavity behind the preform so as to bond thereto. After the injection molding device cycles through holding and cooling, the mold is opened and the resulting automotive trim part or component is ejected.

In certain alternative embodiments, the single or multi-layer color pigmented at least partially extruded sheet may be placed (without preforming) directly into an injection molding device. Semi-molten material injected into the cavity both bonds to and deforms the sheet into a shape of the desired automotive trim part.

In accordance with certain embodiments of this invention, the need for spraying on a paint layer and/or spraying on a liquid clear coat layer may be eliminated. Thus, the resulting product can be made more efficiently, potentially with less capital expenditure as there is no need for a paint or spray line, and/or in a more environmentally safe manner as there is no need for the quantity of solvents or other hazardous materials typically utilized in liquid application processes.

Color matching (where desired) in certain embodiments herein may be better than in conventional systems where color pigmented material is originally formed by injection molding (as opposed to sheet extrusion). This is because of flow patterns and the variety of wall thicknesses found in many conventional injection molding cavities.

Yet another advantage of certain embodiments of this invention is that a color pigmented layer 73 may be bonded (directly or indirectly) to or combined with a material (e.g. base substrate material 125) which cannot readily or acceptably be colored but which has other desired properties (e.g. strength, lesser cost, etc.). Also, a material which has certain desired properties (e.g. scratch resistance, weatherability, etc.) can be bonded to or combined with a material which does not have these properties but which does have other desired characteristics.

Yet another advantage of certain embodiments of this invention is that many trim parts discussed herein can be made using conventional commercially available equipment such as vacuum forming devices, extrusion devices, and/or injection molding devices, thereby limiting capital investment requirements.

Another advantage associated with certain embodiments of this invention is that a color matched part may come directly out of an injection molding apparatus. Thus, there is no need for further finishing (e.g. painting) operations. Any sequence of colors can be placed in an injection molding apparatus.

Another advantage is that flaws such as flow lines, knit lines, and/or sinks may be reduced because they can be hidden or camouflaged. Moreover, gloss/color of the final trim part can be increased or decreased as desired, by polishing of working mold surfaces of the injection molding apparatus, since the final product may come directly from the molding apparatus. For example, the working surfaces of the injection molding devices herein may be polished or plated with Ni, chrome, nickel-chrome, gold, or any other suitable material in order to improve surface finish and DOI of the finished product in certain embodiments. Diamond polishing or any other type of suitable polishing may be done. Also, in certain embodiments, the working surfaces of any injection molding apparatus herein may be grained or partially grained to provide desired appearance characteristics of the final part (e.g. this may be especially useful in embodiments where the preform ends up only partially covering the end part as in the FIG. 22 embodiment).

FIGS. 11(a)–11(i) illustrate different methods of making an at least partially extruded sheet 77 including at least one color pigment inclusive layer(s) 73.

In the FIG. 11(a) embodiment, extruder 71 outputs an approximately planar sheet of color pigmented and metallized thermoplastic material 73 from approximately 0.003 to 0.060 inches thick. Preferably, pellets (or any other suitable form) of colored thermoplastic resin are introduced into extruder 71, heated therein via a heater or screw(s), with the output being fed through an appropriately shaped die (or series of dies) so that substantially planar colored sheet 73 is output. In certain other embodiments, thermoplastic resin, color pigment, and/or metallizing particle(s) may be separately introduced into the extruder in any suitable form(s).

In the FIG. 11(b) embodiment, extruder 71 is a co-extrusion device and its sheet 77 output includes color pigmented and metallized thermoplastic layer 73 as well as optional tie layer 75 bonded to one another. Again, as in all embodiments herein, colored layer 73 is from approximately 0.003 to 0.060 inches thick. The need for tie layer 75 is determined by the compatibility between color pigmented layer 73 and the base substrate plasticized material 119, 125 (e.g. see FIGS. 15, 17, 19 and 23) to be later bonded to it in the injection molding apparatus.

In the FIG. 11(c) embodiment, extruder 71 outputs substantially planar extruded sheet 77 which includes color pigmented and metallized thermoplastic layer 73, optional tie layer 75, and optional clear coat layer 79 bonded to one another. In certain embodiments, clear coat layer 79 may be replaced with a removable protective layer to be discussed below.

In the FIG. 11(d) embodiment, extruder 71 outputs substantially planar sheet 77 which includes color pigmented and metallized thermoplastic layer 73, optional tie layer 75, optional clear coat layer 79, and optional protective coating layer 81 provided over the clear coat layer. Protective layer 81 is substantially transparent in certain embodiments (but may also be opaque), and acts to protect the color and clear coat layers from damage such as scratching until removed. Protective layer 81 may be removed either prior to injection molding, after injection molding, just prior to assembly of the trim part to a vehicle, or even after assembly of the trim part to a vehicle, in different embodiments. Optionally, a tie layer may be provided during extrusion between color layer 73 and clear layer 79 in certain embodiments.

In the FIG. 11(e) embodiment, extruder 71 outputs approximately planar sheet 77 which includes color pigmented and metallized thermoplastic layer 73, optional clear coat layer 79, optional tie layer 83, and optional removable protective layer 81. The need for tie layer 83 is determined by the compatibility between color pigmented layer 73 and the material making up clear coat layer 79. This embodiment differs from that of FIG. 11(d), in that the tie layer is for improving bonding between color layer 73 and clear coat layer 79.

The entire stack shown in FIG. 11(e) may be made by extrusion. Alternatively, layers 73 and 83 may be coextruded and thereafter clear coat 79 and/or protective layer 81 can be laminated thereto. In other embodiments, each of layers 79, 81, and 83 may be laminated onto color layer 73 following its extrusion. Still further, tie layer 83 may be pre-laminated to clear coat layer 79 in certain embodiments, prior to lamination of the stack including 79 and 83 to color layer 73.

FIGS. 11(f) and 11(g) illustrate that while color pigmented layer 73 (which preferably includes metallizing particles distributed therethrough in certain embodiments) is extruded, the optional layers (e.g. 75, 79, 81, and/or 83) may be provided on (directly or indirectly) layer 73 either through extrusion (e.g. coextrusion) or alternatively via post-extrusion laminating step(s). For example, in the FIG. 11(f) embodiment, color pigmented and metallized thermoplastic layer 73 is output from extruder 71. Following this extrusion, clear coat layer 79 and removable protective layer 81 are laminated thereto between opposing heated rollers 85 and 87. Clear coat layer 79 is unrolled from storage roll 87 with its carrier 89 being removed and wound up on roll 91. Meanwhile, protective layer 81 is unwound from storage roll 93. Layers 79 and 81 are laminated and bonded to underlying color pigmented layer 73 at or after the die between pressure-applying rolls 85 and 87, with the result being the partially extruded sheet 77 illustrated in FIG. 11(f).

As discussed above, removable protective layer 81 (e.g. of or including polypropylene or polyethylene) may be extruded along with layer 73. In most preferred embodiments however, protective layer 81 (with or without glue/adhesive thereon) is laminated to layer 73 subsequent to extrusion of layer 73.

In the FIG. 11(g) embodiment, color pigmented and metallized thermoplastic layer 73 is extruded. Thereafter, tie layer 75 is laminated or bonded thereto at or after the die between opposing heated pressure-applying rolls 85 and 87. Tie layer 75 (optionally including UV stabilizers and/or color pigment material) is unwound from storage roll 95 during this post-extrusion lamination process. The illustrated partially extruded sheet 77 results, with the tie layer being located under and on color layer 73. Exemplary material making up, or included within, any tie layer herein is chlorinated polyolefin or CPO (with or without uv or other types of stabilizers) available from, for example, 3M of Minnesota (e.g. model 3M 4298 UV from 3M). Another suitable material for a tie layer is available from Rexam Custom. Other suitable polymers may also be used. Tie layers in certain embodiments herein may be substantially transparent to visible light.

It is noted that tie layer(s) may be provided between any or all layers discussed herein. In different embodiments, tie layer 75 may be laminated to single, double, triple, or quadruple layers of extrusion (e.g. extrusions in FIGS. 11(a) and 11(e)) as will be appreciated by those of skill in the art. Moreover, tie layer 75 may be replaced with an adhesive layer in some embodiments as will be discussed below. In certain embodiments where two adjacent layers are of similar materials that can naturally adhere to one another, a tie layer is not needed between the two adjacent layers.

In the FIG. 11(h) embodiment, extruder 71 outputs sheet 77 that includes color pigmented and/or metallized layer 73, first tie layer 75 on a bottom side of layer 73, second tie layer 83 on a top side of layer 73, and clear coat layer 79, all bonded to one another. Tie layer 83 promotes adhesion or bonding between color layer 73 and clear coat layer 79. Bottom tie layer 75 is for promoting adhesion between color layer 73 and base substrate 125 to be discussed below.

In the FIG. 11(i) embodiment, a sheet 77 similar to that of FIG. 11(h) results. However, in FIG. 11(i), a prelaminate including upper tie layer 83 and clear coat layer 79 are not extruded with the color layer, but instead are post-extrusion laminated to the color layer at or after the die between rolls 85 and 87. Coextruder 71 outputs an article including color pigmented and/or metallized layer 73, and bottom tie layer 75. The prelaminate is subsequently laminated thereto, so that resulting sheet 77 includes layers 73, 75, 79, and 83. Optionally, a removable protective layer may also be laminated to the sheet.

As an alternative to the embodiments of any of FIGS. 11(g)–11(i), bottom tie layer 75 may be replaced with an adhesive layer. Such an adhesive layer is particularly useful when a thermoset material is to be used as base substrate 125. The adhesive may help bond the base substrate 125 to color layer 73. The adhesive may be provided on layer 73 in an in-line procedure (or thereafter) by brushing, spraying, dipping, flow coating, or the like. It is noted that the adhesive may have to be cured/dried or B-staged prior to an injection molding step in certain embodiments. Thermoset base substrates 125 are preferably bonded to color layers 73 by way of reaction injection molding (RIM).

FIGS. 11(j)–11(l) are end cross sectional views illustrating that sheets 77 may take different shapes in different embodiments of this invention. As shown in FIG. 11(j), the most preferred embodiment, sheets 77 of any above embodiment exiting the extruder (and/or laminating steps) are approximately flat or planar in shape. However, in alternative embodiment illustrated in FIGS. 11(k) and 11(l), sheets 77 of any above embodiment exiting the extruder (and/or laminating steps) may take different forms so as to include curves or bends therein. The bends and curves are not particularly problematic because the sheet is initially formed via extrusion (as opposed to injection molding), and the semi-molten material in the extruder is not pushed around corners, but rather along them (i.e. there is less of a tendency for metallizing particle and/or color pigment to collect in corners or at other structures). Thus, the term "sheet" 77 herein includes sheets of different shapes and sizes and is not limited to flat or planar sheets unless specifically recited.

Colored and metallized layers 73 described above may be formed by known blown film extrusion techniques, sheet extrusion techniques, or the like. For example, any of the extrusion technique(s) and/or device(s) disclosed in any of U.S. Pat. Nos. 3,565,985; 3,759,647; 3,773,882; 3,884,606; 5,478,516; 5,226,998; 5,409,653; or 5,486,327, may be used as extruder 71 (provided that an approximately planar sheet is output as shown in any of FIGS. 11(a)–11(i)), the disclosures of all of these patents being hereby incorporated herein by reference.

The results of the different processes illustrated in FIGS. 11(a)–11(i) is sheet 77 which is at least partially extruded. Sheet 77 may consist of a single colored and/or metallized layer as in the FIG. 11(a) embodiment, or may include multiple layers as illustrated in the FIG. 11(b)–11(i) embodiments. In any event, the terms "at least partially extruded sheet", "sheet" and reference number "77" herein are used to refer to any single or multiple layer sheet or article which is at least partially extruded as exemplified by any of the sheets 77 of FIGS. 11(a)–11(l).

Figure 6:
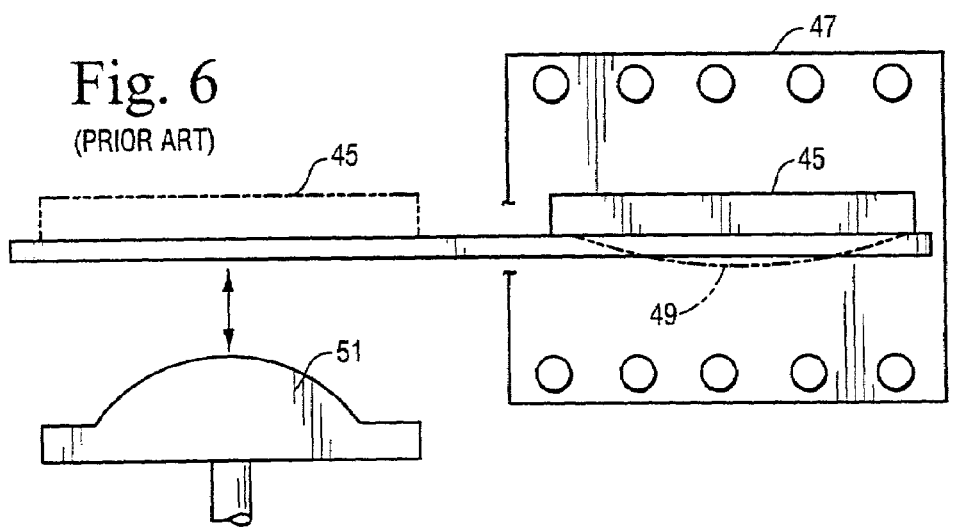
FIG. 6 is a prior art schematic view illustrating a thermoforming step in which a paint-coated laminate of FIG. 5 is heated prior to vacuum-forming.
Figure 7:
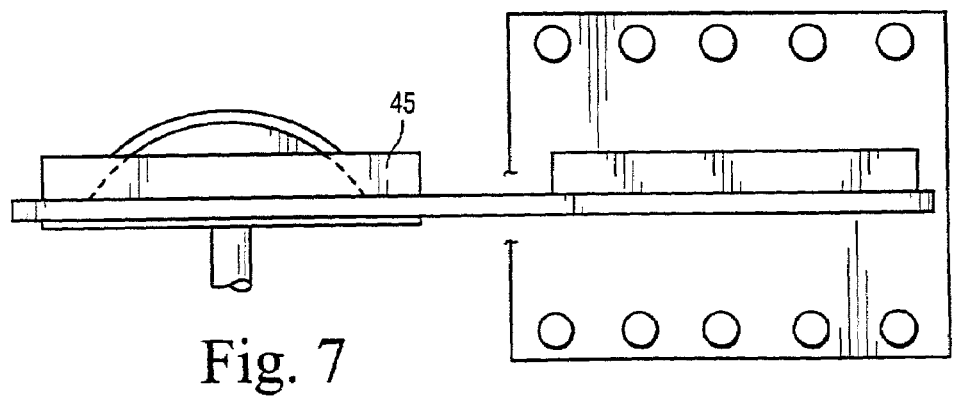
FIG. 7 is a prior art schematic view illustrating vacuum-forming of the FIGS. 5–6 laminate.
Figure 8:
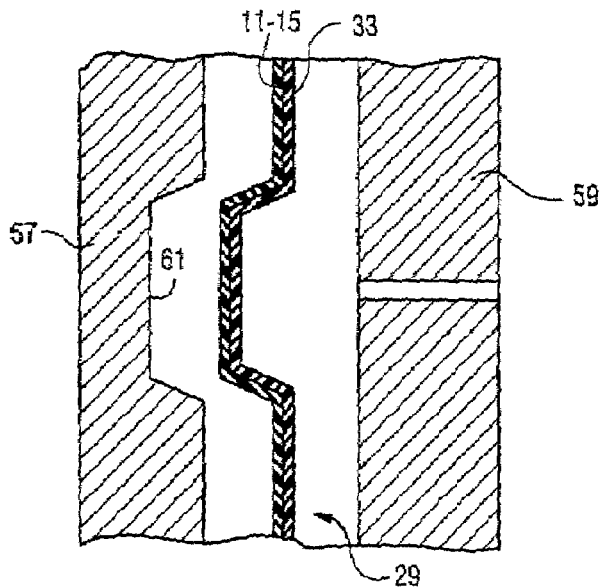
FIG. 8 is a prior art cross-sectional view illustrating a preliminary step in which a vacuum-formed laminate is inserted into the cavity of an injection molding device.
Figure 9:
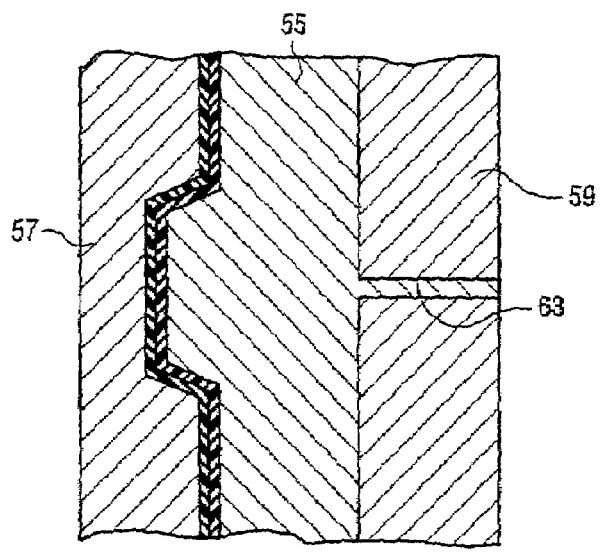
FIG. 9 is a prior art cross-sectional view illustrating the injection of plasticized or semi-molten material into the FIG. 8 injection molding device behind the vacuum-formed laminate in order to form a molded automotive trim component or product.
Figure 10:
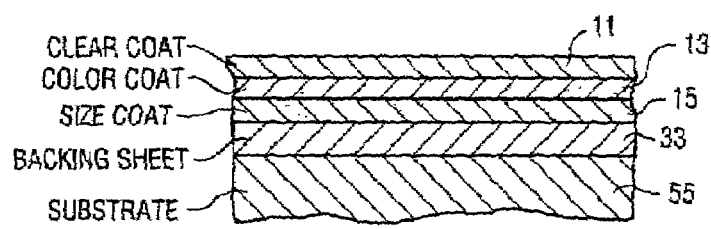
FIG. 10 is a prior art cross-sectional view of a section of the automotive trim component formed in FIG. 9.

The at least partially extruded sheet 77 of any embodiment may be wound onto a roll or cut into separate sheets for transportation and/or storage. Thereafter, sheet 77 may be thermoformed into a three-dimensionally shaped "preform" using a vacuum-forming device or any other acceptable thermoforming apparatus. The preform may be an approximate match of the intended trim part contour or alternatively an intermediate shape. Sheet 77 may be shaped into such a preform by utilizing the vacuum-forming apparatus and techniques illustrated in FIGS. 6–7 as described above. Alternatively, sheet 77 may be thermoformed using the vacuum-forming apparatus illustrated in FIGS. 12 and 13.

Referencing FIGS. 12–13, the vacuum-forming apparatus includes vacuum molding buck or die 99, a plurality of vacuum suction holes 101 in die 99, and vacuum suction pump 103 which communicates with holes 101 via conduit 105. On/off valve 107 is provided so that vacuum pump 103 may selectively vacuum air through holes 101. Sheet 77 is softened by heating it to a preheating temperature as discussed above. Following preheating, buck or die 99 may be raised toward sheet 77 and/or vacuum 103 applied to draw the sheet into contact with the working surface of die 99 as shown in FIG. 13. Thus, sheet 77 is three-dimensionally shaped into preform 111. After it has cooled, the resulting preform 111 shown in FIGS. 13–14 has a shape approximating that of the working surface of die 99. As discussed above, this shape may have a contour of the intended trim part, or of an intermediate shape. Thermo-forming processes herein may also be utilized in certain embodiments to create pin holes or tabs in order to assist in locating the resulting preform in an injection molding apparatus to be described below. It is noted that male or female type vacuum forming devices may be utilized in different embodiments of this invention in shaping the preform. Optionally, positive air pressure may be applied to the free face of the sheet on the opposite side of the buck in order to increase pressure. Optionally, spring(s) [either localized or spread approximately uniformly across the sheet surface], air bladder(s), or other biasing means may be provided to apply force to the free face of the sheet on the opposite side of the buck during vacuum forming in order to increase the forming pressure and/or provide for a more smoothly contoured surface of the resulting preform.

The single or multi-layered preform may optionally be trimmed using a die, laser trim, water jet trim, or the like following its removal from the vacuum-forming apparatus. Alternatively, trimming of the preform may take place in the vacuum forming die.

The term "preform" is used herein to describe a three-dimensionally shaped single or multiple layered sheet which has been thermoformed. Preform 111 is illustrated in FIGS. 13–14 and 16–17 as including two layers. This is for purposes of example, only. Preforms may include only a colored layer (see the FIG. 11(a) embodiment), or alternatively may include any of the multi-layers disclosed in any of the FIG. 11(b)–11(i) embodiments.

Preform 111 is then placed or inserted into the cavity half of an injection molding apparatus, manually or using robotics or other automation. Preform 111 may be held in place in the apparatus through the use of gravity, pins, tape, static electricity, vacuum, and/or other suitable means.

FIGS. 15 and 16 illustrate different injection molding devices into which preform 111 may be inserted (the FIG. 15 device may function as both a vacuum forming device and as an injection molding device, while the FIG. 16 device is a conventional injection molding apparatus). Referring to FIG. 15, the preform may remain in the cavity after thermoforming for the injection molding to take place. The FIG. 15 injection molding apparatus includes first and second mold halves 113 (male or core) and 115 (cavity or female half). The preform is shaped so as to approximately match in shape or contour the inner surface of mold half or die 115. Preform 111 is preferably placed or located in cavity 117 so that the surface to be viewed by an observer of the automobile comes to rest against the working surface of die 115. Thereafter, heated semi-molten plastic resin 119 is injected into cavity 117 through aperture 121 provided in die 113 in order to form molded base substrate 125 (see FIGS. 20–24). The term "semi-molten" means capable of flowing into the molding area. The pressure from the injecting of resin 119 into cavity 117, combined with the temperature within the cavity and the surface of dies 113 and 115, causes resin 119 to fuse together with or bond to the interior surface of preform 111. When a tie layer is present, it may be located between the color layer 73 and the semi-molten material injected into the cavity so as to promote adhesion or bonding between color layer 73 and base substrate 125.

The result is multi-layered trim part 127 as shown in any of FIGS. 20–24, which is three-dimensionally molded in a shape suitable for the desired exterior automotive application. The trim part 127 includes base substrate for strength and stability reasons, and colored layer system 111 bonded thereto. Colored layer system 111 of product 127 may include a single color pigmented layer 73 (resulting from the FIG. 11(a) embodiment), or alternatively may include multiple layers including colored layer 73 as illustrated in any of the FIG. 11(b)–11(i) embodiments.

For purposes of example, FIG. 23 illustrates a partial cross sectional view of a final trim part after injection molding when the FIG. 11(c) embodiment was used to form sheet 77 which later resulted in layer system 111. FIG. 24 illustrates a partial cross sectional view of a final trim part after injection molding when the sheets 77 of either the FIG. 11(h) or 11(i) embodiments are used, which sheet(s) later result in layer system 111.

FIGS. 16–17 illustrate another injection molding apparatus. Preform 111 is placed in cavity between the mold halves. The working surface 114 of mold 115 is shaped so as to approximately match the exterior surface of preform 111, or vice versa. The injection molding apparatus will cycle, trapping preform 111 between the two mold halves, and heated semi-molten material is injected through aperture 121 into cavity 117 behind the preform as shown in FIG. 17. The semi-molten material bonds to preform 111, and forms base substrate portion 125 of the final trim part 127. The materials making up portions 111 and 125 may be of the same or different materials/colors. After the injection molding apparatus cycles through holding and cooling steps, it opens and ejects what may be a final automotive trim part 127. The part may require edge trimming or gate removal after removal from the mold in some circumstances. Exemplary cross sections of final trim parts are shown in FIGS. 20–24.

FIGS. 18–19 illustrate another embodiment of this invention. This embodiment differs from the FIGS. 12–17 embodiments in that sheet 77 has not been vacuum-formed before being inserted into the injection molding apparatus. The sheet as shown in any of FIGS. 11(a)–11(j) may be placed in cavity 117. Referring to FIGS. 18–19, flat or planar sheet 77 is placed in cavity 117 between molds 113 and 115 of the injection molding apparatus. The sheet may be cut to size to fit in the cavity, or indexed (manually or automatically) from a wound coil of the sheet. Thereafter, heated semi-molten (i.e. flowable) material is injected through aperture 121 into cavity 117 as shown in FIG. 19. The pressure applied by this semi-molten material upon sheet 77 causes the sheet to deform into the shape of the working surface of die 115 as it is pressed against the same, and the semi-molten material bonds to the sheet and forms base substrate portion 125 of the trim part. When the mold is opened, trim part 127 of any of FIGS. 20–24 is removed.

In a variation of the FIGS. 18–19 embodiment, a shaped sheet 77 as shown, for example, in either of FIGS. 11(k) or 11(l) may be placed directly into the injection molding device without vacuum-forming. The sheet 77 can even be extruded in a three-dimensional shape for matching a mold half of the injection molding device. After sheet 77 is positioned in cavity 117, semi-molten material is shot into the cavity and bonds to the sheet for form a final product in accordance with, for example, any of FIGS. 20–24.

FIGS. 15–19 illustrate aperture 121 through which semi-molten material 119 for forming base substrate 125 is shot into cavity 117. However, in alternative embodiments the semi-molten material 119 may be injected into cavity 117 through hole(s) or gate(s) at the side(s) of the cavity near where the mold halves meet. Multiple such gates, or a single gate, may be utilized. In certain embodiments, sequentially valved gates may be used so that a plurality of injection gates are sequentially opened one after another and material 119 injected into cavity 117 therethrough in a corresponding sequential manner. Alternatively, material 119 may be injected into any cavity 117 herein through multiple injection gates at the same time.

Sheet 77 is illustrated in FIGS. 12 and 18 as including two layers. This is for purposes of example, only. The sheet may include only a colored layer (from the FIG. 11(a) embodiment), or alternatively may include any of the multi-layer systems disclosed in any of the FIG. 11(b)–11(i) embodiments.

Either vertical or horizontal injection molding presses (e.g. 50 to 4,000 ton or larger), or low pressure injection molding devices, may be used herein for any of the discussed molding devices. For example, any of the injection molding devices shown or described in any of U.S. Ser. No. 09/210,852 may be used herein for injection molding purposes. In certain embodiments, coinjection molding devices may also be used in accordance with any embodiment herein. Gas assisted injection molding devices may be used in certain embodiments of this invention. Moreover, any product described herein may be made using a dual injection molding process using similar or dissimilar material(s).

In certain embodiments of this invention, the injection molding and/or extrusion die(s) used herein may be chrome plated to improve gloss and/or shine characteristics of end parts. These dies may be made of or include P20 steel, stainless steel, or any other suitable material in different embodiments. In certain embodiments, the extrusion die may comprise a single plate, or alternative multiple plates (e.g. from about 1–10 different plates).

FIG. 22 illustrates an embodiment of this invention wherein colored preform 111 (or sheet 77) is sized so that it does not completely cover the entire viewable surface of base substrate 125. The is determined by the shape(s) and contour of the mold(s) of the injection molding apparatus. This allows for a two-tone appearance and/or direct access to cured injection molded material 125 for subsequent operations (e.g. application of adhesive(s), addition of mechanical attachment(s), etc.).

Extruded color pigmented and/or metallized thermoplastic layer 73 is the layer which primarily determines (or primarily contributes to) the color of the trim product. This is because layer 73 is the primary colored layer of layer system 111 (and sheet 77). Layer 73 is made of an extrudable material. Layer 73, in certain embodiments, may be of or comprise a polyolefinic thermoplastic resin (TPO) including color producing pigments and/or additives, ultraviolet stabilizers, and/or other additives conventionally used in thermoplastic resins for producing automotive exterior components. An exemplar material which may be used as color pigmented layer 73 in certain embodiments of this invention is Millennium III™, which may result in a glass-filled polycarbonate rigid sheet with optional GE Lexan™ layers on top and bottom (ABA tri-manifold coextrusion). Millennium III is available from Spartech Alloy Plastics, and is a composite product of 20% (preferably from about 10–30%) glass-filled polycarbonate that provides the physical properties of glass-filled polycarbonate with a "Class A" finish of a standard polycarbonate sheet. Additional exemplar color materials which may be used as layer 73 include: Montell Hivalloy polyolefins, where copolymer alloys are created between polyolefins (e.g. semi-crystalline polymer) and normally incompatible amorphous polymers. This creates for layer 73 a continuous polyolefin matrix with dispersed amorphous phase, where polymers are chemically linked similar to a graft copolymer. The amorphous polymer components may be styrene or acrylic. This material for layer 73 may have a low density of from about 0.93 to 0.95 g/cc, excellent chemical resistance, excellent weatherability (including UV resistance), etc. Both Montell Hivalloy XPA018 30% glass reinforced resin, and Hivalloy XPA052 high flow general purpose resin may be used in different embodiments of this invention. Color layer 73 may also be made of or include TPO, PP, PE, TPU, PBT, nylon, surlyn, ionomer resin, a mixture or combination of surlyn and polyethylene, ABS, PC (polycarbonate), PC & ABS mixture, PVC, or any suitable combination thereof. Other material(s) which may be used for or included in the color layer is/are Formion (e.g. model(s) colored FI 120, FI 105, or FI 395) available from A. Schulman of Akron, Ohio [these are formulated ionomer resins] In other embodiments, any of the pigment inclusive thermoplastic polyolefin color layers disclosed in U.S. Pat. No. 5,037,680 (incorporated herein by reference) may be used as color layer 73.

The metallizing particles that can be provided in color pigmented layer 73 are any of those that can provide a finish with metallic glamour. These include conventional is metallic flake pigments, such as aluminum flake, nickel flake, nickel-chrome flake, as well as other know mineral flake materials such as mica that can be used to metallize the appearance of the finish for the trim part. In certain embodiments, such metallizing particles may be provided in color layer 73 as well as clear coat layer 79, and/or any tie layer herein. The metallizing particles are preferably added during the extrusion process as part of the resin pellets, or alternatively within pellet or other carriers of their own, so that the metallizing particles are approximately fairly consistently distributed or spread throughout layer 73. In certain embodiments of this invention, in the final trim part color layer 73 includes therein at least about five (5) metallizing particles per square inch view area that are at least partially visible, more preferably at least about ten (10) metallizing particles per square inch viewing area that are at least partially visible, most preferably at least about twenty (20) such particles per square inch that are at least partially visible.

During the extrusion process, most of the metallizing particles may tend to become oriented in approximately the same direction or position throughout the color layer. Thus, in order to provide for a random appearance of the metallizing particles, similar to that of a metallized liquid paint layer, different sizes and/or shapes of metallizing particles may be provided in the color layer(s). In certain embodiments of this invention, a plurality of the same type (e.g. aluminum flakes of approximately the same size and/or shape) of metallizing particles may be provided in the extruder prior to the extruding screw. However, in such embodiments, the screw may tend to deform such metallizing particles making them smaller, bent, or the like. Thus, in addition to introducing a first type of metallizing particles into the extruder prior to the screw, it is also possible in certain embodiment to additionally add metallizing particles of the first or a different type to the extruding system after the screw but before or at one of the extruding die(s). In certain embodiments, different sizes, shapes, and of materials may be used for the metallizing particles so that the final trim product has the appearance of metallizing particles randomly distributed therethrough similar to the appearance of a final liquid painted product with such particles in the paint.

Thus, for example, metalizing aluminum flakes of a first size and nickel flakes of a first size may be introduced into the extruder along with the color material prior to or at the mouth of the extruder's screw. Additionally, more metallizing aluminum flakes of the first or a second size and/or shape, as well as nickel and/or mica flakes of the first or a second size and/or shape may be introduced at the extrusion die (post-screw). Thus, the resulting color layer may have a plurality different types (e.g. different material, different size, and/or different shape) of metallizing particles therein when the color layer exits the extruder die. This may provide for a random appearance to a viewer of the metallizing particles throughout the color layer (however, the color pigment material is preferably approximately uniformly distributed throughout the color layer). The use of larger and smaller sized particles allows for a random appearance which is preferred in certain embodiments, thereby allowing the end product on a vehicle to closely resemble the orientation and appearance of metallic found in liquid painted parts.

As another example, metallizing particles of a first type may be provided within the polymer-based resin (e.g. in pellet form) originally fed into the extruder; while additional metallizing particles of the same or a different type may be added (e.g. metered into) to the extruder either where the resin pellets are originally fed prior to the screw or after the screw at or before the extrusion die.

Thus, in addition to metallic particles introduced into the extruder along with the polymer-based resin, additional metallic particle(s) of the same or different types may be added separately, prior to or at the mouth of the screw, after the screw prior to the die, or directly into the die (one or multiple sections of the die) using a proportional feed mechanism. It may be done at any or any combination(s) of these locations. Different types (e.g. different sizes, shapes, and/or material) may be added at each location.

Referring to FIGS. 15, 17, and 19–24, base substrate 125 (e.g. made from plastic resin 119 injected into injection molding cavity 117) may be made from any suitable polymer-based semi-molten resin which is injected into the cavity of an injection molding device (thermoplastic or thermoset). The material therefor may contain various fillers to provide strength, stability or any other desired feature. Resin 119 may optionally include foaming agent(s) to reduce the weight of the finished trim part, and/or post industrial or post consumer recycled material. Substrate 125 may be transparent, may be colored (it may match the color of the preform 111 in some embodiments), or may be opaque. Molded polymer substrate 125 may be selected to provide rigidity, thickness, and/or other desirable properties. Suitable polymers for making base substrate 125 include, for example, polyvinyl chloride, a formulated ionomer combination or polyethylene (PE) and surlyn, polycarbonate (PC), polystyrene, formulated ionomer, polypropylene (PP), polyethylene (PE), acrylonitrile-butadiene-styrene (ABS), nylon, surlyn, polyester, co-polymers, PC & ABS mixture, foamed plastic, ionomers, polyolefin (TPO), TPU, homopolymers co-polymers, urethanes, and/or any suitable combination thereof. Polyolefin, homopolymers, and copolymers are thermoplastic resins which have good molding properties and may also be used as or in substrate 125 in preferred embodiments. Likewise, polypropylene has many performance properties suitable for automotive exterior uses, as do acid co-polymers of polyethylene, all of which may be used as or in the material of substrate 125. Substrate 125 may be from about 1.0 to 5.5 mm thick, most preferably from about 1.5 mm to 4.0 mm thick in certain areas thereof. It is noted above that thermoplastic material is preferably used as substrate 125. However, in alternative embodiments, thermoset material may be used as substrate 125 (or any other material in system 111) so that the same may later be re-formed. Reaction injection molding (RIM) techniques, sheet molding compound, or compression molding may be used to form substrate 125 in certain alternative embodiments when base substrate 125 is of or includes a thermoset material.

A single optional clear coat layer 79 is shown in FIGS. 11(c)–11(f), and 11(h)–11(i). However, it is recognized that multiple clear layers 79 may be provided on top of one another in alternative embodiments. Clear coat layer(s) 79 is transparent or substantially transparent to visible light. In certain preferred embodiments, each clear coat 79 is at least 90% transparent to visible light rays, more preferably at least 95% transparent to visible light rays, and most preferably at least about 98% transparent to visible light rays. Optionally, clear coat layer 79 may include color pigment material for slightly coloring the same (the color pigment may match or approximately match the color of underlying layer 73) and/or metallizing particles. Clear coat layer(s) 79 is provided for giving the trim product a high gloss finish, protecting color layer 73, and/or providing a coating which is resistant to scratching, abrasions, marring, heat, UV radiation, and weathering. Different types of materials may be used to make clear coat 79. Layer 79 may be made, for example, of a thermoplastic synthetic resinous composition. Clear coat 79 may, for example, include or be made of a blend of a thermoplastic fluorinated polymer and an acrylic resin where the polymer component may be a thermoplastic fluorocarbon such as polyvinylidene fluoride and the acrylic resin may be polymethyl methacrylate or polyethyl methacryate resin, or mixtures thereof. A surlyn inclusive ionomer may also be used for the clear coat layer. Other materials which may be utilized to form substantially transparent clear coat 79 include polycarbonate base available from Avery Dennison (Troy, Michigan) or Kurz-Hastings (Philadelphia, Pa.). In certain embodiments, clear coat layer(s) 79 may be made of or include a 2 mil thick clear coat material model RD20780701, obtainable from Rexam Custom (located in North Carolina) or Elf (located in Minnesota); or alternatively may be of clear FI 120 available from A. Schulman, Akron, Ohio. Clear layer 79 may be from about 0.00015 to 0.080 inches thick in certain embodiments of this invention, preferably from about 0.00015 to 0.040 inches thick, and most preferably from about 0.00015 to 0.020 inches thick (e.g. about 0.010 in. thick). Clear layer 79 may also be made of or include a thermoplastic such as PC, PVC or TPU, but may be thicker in such embodiments. Additionally, in certain embodiments, clear coat 79 may be placed on a polyester or polyethylene carrier, with the combination being from about 0.020 inches to 0.200 inches thick. The carrier may be removed prior to assembly onto the vehicle, in a manner similar to protective layer 81.

In an exemplary non-limiting embodiment of this invention, a trim part may be made as follows. A color layer approximately 0.030 inches thick of colored FI 120 (formulated ionomer, available from A. Schulman) with metallic particles therein is coextruded with a clear coat layer approximately 0.010 inches thick of clear FI 120. No tie layer is necessary between the two layers as they are of similar materials and naturally may adhere to one another. This coextruded sheet is then vacuum formed into a preform. The preform is inserted into an injection molding apparatus and base substrate material of polyester or of a FI 335 (glass filled formulated ionomer, available from A. Schulman) is shot thereinto behind the preform. No tie layer is needed between the color layer and the FI 335 base substrate layer as they are of similar materials and may naturally bond to one another.

In certain embodiments of this invention, color-pigmented layer 73 may have a tensile modulus (ASTM D-638, incorporated herein by reference) of from about 500,000 to 700,000 psi, and more preferably from about 550,000 to 600,000 psi. In certain embodiments, layer 73 has a specific gravity of from about 0.8 to 1.3, preferably from about 0.9 to 1.2. In certain embodiments of this invention, color-pigmented layer 73 has a tensile strength (ASTM D-638, incorporated herein by reference) of at least about 10,000 psi, and preferably at least about 11,000 psi. Layer 73 may have a tensile strength of from about 11,000 to 12,000 psi. In certain embodiments of this invention, color-pigmented layer 73 has a flexural modulus (ASTM D-790, incorporated herein by reference) of from about 700,000 to 800,000 psi, preferably from about 725,000 to 750,000 psi. Also, in certain embodiments, layer 73 has a flexural modulus of from about 1900–2000 MPa average. In certain embodiments of this invention, layer 73 has a flexural strength (ASTM D-790, incorporated herein by reference) of at least about 20,000 psi. Layer 73 may have a flexural strength of from about 20,000 to 22,000 psi. In certain embodiments of this invention, layer 73 has a coefficient of thermal expansion (ASTM D-696, incorporated herein by reference) of from about $1.0 \times 10^{-5}$ to $5.0 \times 10^{-5}$ (in./in./degrees F.), and more preferably from about $3.0 \times 10^{-5}$ to $3.5 \times 10^{-5}$ Layer 73 preferably has a coefficient of thermal expansion of at least about $3.0 \times 10^{-5}$ in./in./degrees F. In certain embodiments of this invention, layer 73 has a hardness (ASTM D-785, incorporated herein by reference) of at least about 110 (Rockwell "R"), and more preferably of at least about 115 (Rockwell "R"). In certain embodiments of this invention, layer 73 has a tensile strength at yield of from about 50–60 MPa average, a deflection temperature under load (455 kPa) of from about 90–100 C. average, and/or a deflection temperature under load (1820 kPa) of from about 60–65 C. average. The melt temperature of layer 73 is preferably from about 400–600 degrees F., more preferably from about 425–500 degrees F.

Layer 73 also may have less sag than other materials such as Dow M910 ABS and Centrex 811 ASA in certain embodiments. For example, in certain embodiments, when a 6.5 inch span of layer 73 is exposed to 250 degrees F. for one hour to measure sagging of the layer, suspended layer 73 may sag downward less than about 0.5 inches, preferably less than about 0.3 inches.

In certain embodiments of this invention, color-pigmented layer 73 may have (e.g. Hivalloy Acrylic/PP WXPA011 from Montell, SAE J1960, exterior) a color shift (Delta E), black, of less than about 0.5, preferably less than or equal to about 0.3, and most preferably less than or equal to about 0.2 (e.g. material 1800 kJ/m$^2$). Layer 73 may have a color change after 2500 kJ/m$^2$ of less than about 0.3. Layer 73, alone, in certain embodiments of this invention, may have a gloss retention [e.g. black color, initial 90.1, 60 degree angle, 2500 kJ/m², to 84] of at least about 90% and preferably of at least about 93%. At another angle (e.g. 20 degrees viewing), layer 73, alone, in certain embodiments of this invention may have a gloss retention [e.g. black color, initial 83.2, 20 degree angle, 2500 kJ/m², to 74.1] of at least about 80%, and preferably of at least about 89% at this 20 degree angle. Layer 73, alone in certain embodiments, when run through 6 months SAE J1976, Florida Test (60 degree gloss), may have a gloss retention of at least about 90%, and preferably of at least about 95.0% [ΔE=0.12, ΔL=0.05, Δa=0, Δb=0.09, Δc=0.08]. As for white color in certain embodiments of this invention, layer 73 may have a gloss retention of at least about 99% [ΔE=1.8, SAE J1960 Montell Hivalloy acrylic/pp copolymer WXPA012].

With regard to chemical resistance, color-pigmented layer 73 may pass the following tests, for each of which the following chemicals applied with a gause swab and exposure for 48 hours. The tests are passed when after application and exposure, visual inspection evidenced no cracks or crazing. Exemplary tests passed are as follows: (a) at 23 degrees C., 0% strain level, passed for each of windshield washer fluid, automatic transmission fluid, tar and road oil remover, brake fluid, coolant concentrate, motor oil, and ASTM Fuel C+15% MeOH being separately applied to layer 73; (b) at 60 degrees C., 0.0% strain level, passed for each of the chemicals in (a) above except the fuel.

The color imparted to layer 73 may be imparted by ingredients and techniques known in the art. The color pigmentation of resin layer 73 is carried out to produce a desired value on a color chart. Typically, the coloration is provided to the layer 73 utilizing various combinations of color pigment additives such as titanium dioxide, blue tone phthalocyanine green, yellow tone phthalocyanine green, green tone phthalocyanine blue, lamp black, and/or carbon black. The amounts of color additives and the particular combinations thereof utilized to achieve desired color in layer 73 are known in the art.

Ultraviolet radiation deterioration preventing elements may also be provided in layer 73, tie layer(s), and/or clear coat layers herein. These include carbon black, white pigments, organic ultraviolet stabilizers, and other pigments which absorb and/or reflect ultraviolet radiation.

These trim products, with regard to gloss, may have a specular reflectance for a clear coat surface of at least about 60–65 gloss units at an angle of 20° from normal, and at least about 75–80 gloss units at an angle of 60° from normal. Specular reflectance and other criteria herein are measured prior to buffing and waxing, and a preferred test method is described in GM test specification TM-204-A. Certain embodiments of this invention are also applicable to low and/or medium gloss products. Final trim parts according to different embodiments of this invention may exhibit high (85+), medium or low gloss depending upon the desired application.

Distinctiveness of image (DOI) is a measurement of the clarity of an image reflected by the finished surface. Each of these products/parts may have a DOI of at least about 60 units, where 100 is the maximum DOI reading, measured by a Hunter Lab, Model No. D47R-6F Dorigon gloss meter. Details of this DOI test procedure are described in GM test specification GM-204-M which is incorporated herein by reference.

With regard to gasoline resistance, each of these products 127 (or parts) may experience substantially no color change, degradation, tackiness, marring, or the like after being immersed for 10 seconds, ten (10) times, in gasoline with a 20 second dry off period between each immersion. Immediately after the tenth immersion, the surface of these products preferably passes the thumbnail hardness test according to GM test specification TM-55-6, which is incorporated herein by reference.

With regard to cleanability, in certain embodiments, products 127 can withstand ten rubs with cheesecloth saturated with 9981062 Naphtha (or currently used in other approved cleaning solvents), with no substantial evidence of staining, discoloration, or softening of the exterior surface. This test requires no evidence of color transfer from the test part to the cloth. One rub consists of one forward and backward motion.

With regard to acid spotting resistance, trim products/parts 127 may withstand exposure to 0.1 N sulfuric acid for sixteen (16) hours without any evidence of staining, discoloration, or softening of the painted surface.

As for hardness, trim products/parts 127 may have a hardness of at least four based upon the Knoop hardness test, which is incorporated herein by reference.

As for abrasion resistance, trim parts 127 may withstand the Gravelometer standard test identified in SAE J-400 at −10° F. with a minimum rating of 8, this test method being incorporated herein by reference.

As for impact strength, trim products/parts 127 may withstand at least 20 lbs. per inch of direct impact with no failure.

As for UV resistance, also known as accelerated weathering or QUV, products 127 may not show any significant surface deterioration or embrittlement, loss of adhesion, objectionable shrinking, or noticeable color or gloss change after about 500–1,000 hours exposure to UV light and condensation apparatus per ASTM G-53 using eight hour UV cycle at 70° C. and four hour humidity cycle at 50° C., this test procedure being incorporated herein by reference.

As for water and humidity exposure, trim products/parts 127 may withstand ninety-six hours of humidity exposure at 100% relative humidity and 100° F. in a humidity cabinet defined in GM test specification TM553 (incorporated herein by reference), and a two hour water immersion test at 100° F. according to GM test specification TM55-12 (incorporated herein by reference). The resulting product preferably shows no evidence of blistering when examined one minute after removal from the test cabinet. Additionally, trim products 127 may withstand fifteen cycles of moisture-cold cycle test defined in GM test specification TM45-61A (incorporated herein by reference), without experiencing any visible signs of cracking or blistering.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A method of making a colored automotive trim product, the method comprising:

extruding an approximately planar sheet including a colored layer including color pigment material;

providing a substantially transparent clear coat layer comprising a thermoplastic fluorinated polymer over the colored layer;

providing at least one tie layer between the colored layer and the substantially transparent clear coat layer;

positioning the substantially transparent clear coat layer together with the colored layer and the tie layer in a vacuum forming apparatus;

vacuum forming the substantially transparent clear coat layer together with the colored layer and the tie layer into a three-dimensionally shaped preform;

utilizing the three-dimensionally shaped preform as at least a portion of an exterior trim product for a vehicle; and forming a base layer comprising polyolefinic thermoplastic resin by injection molding, beneath the colored layer so that the colored layer is provided between the base layer and the tie layer, and wherein the base layer and the colored layer are separate and distinct layers.

2. The method of claim 1, wherein the colored layer comprises TPO.

3. The method of claim 1, wherein the colored layer further comprises metallizing particles.

* * * * *